(12) United States Patent
Hagen et al.

(10) Patent No.: US 7,690,178 B2
(45) Date of Patent: Apr. 6, 2010

(54) LAWN MOWER WITH GRASS STRIPING MECHANISM

(75) Inventors: Kyle Hagen, Redondo Beach, CA (US); Shane Simon, Cascade, IA (US)

(73) Assignee: Kubota Tractor Corporation, Osaka (JP)

(*) Notice: Subject to any disclaimer, the term of this patent is extended or adjusted under 35 U.S.C. 154(b) by 34 days.

(21) Appl. No.: 11/865,953

(22) Filed: Oct. 2, 2007

(65) Prior Publication Data

US 2008/0289310 A1 Nov. 27, 2008

Related U.S. Application Data

(60) Provisional application No. 60/827,772, filed on Oct. 2, 2006.

(51) Int. Cl.
*A01D 67/00* (2006.01)

(52) U.S. Cl. ..................................... 56/320.1

(58) Field of Classification Search ............... 56/1, 56/16.7, 17.4, 320.1, DIG. 9, DIG. 20, DIG. 24; 15/78
See application file for complete search history.

(56) References Cited

U.S. PATENT DOCUMENTS

| | | | | |
|---|---|---|---|---|
| 2,520,488 | A | * 8/1950 | Batchelder | ............... 56/16.7 |
| 3,402,535 | A | 9/1968 | Nelson | |
| 3,483,684 | A | * 12/1969 | Price | ............... 56/13.6 |
| 3,537,720 | A | 11/1970 | Irgens | |
| 3,755,998 | A | * 9/1973 | Hoffmeyer | ............... 56/255 |
| 5,822,960 | A | 10/1998 | Kitamura et al. | |
| 5,870,888 | A | 2/1999 | Pugh | |
| 6,047,530 | A | 4/2000 | Bednar | |
| 6,202,396 | B1 | 3/2001 | Thomas | |
| 6,336,311 | B1 | 1/2002 | Bednar | |
| 6,336,312 | B1 | 1/2002 | Bednar et al. | |
| 6,523,335 | B2 | 2/2003 | Vanderipe | |
| 6,588,191 | B2 | 7/2003 | Berndt et al. | |
| 6,675,567 | B2 | 1/2004 | Samejima et al. | |
| 6,832,468 | B2 | 12/2004 | Weinlader | |
| 6,928,798 | B2 | 8/2005 | Hensley et al. | |
| 6,962,039 | B2 | 11/2005 | Greenhoe | |
| 6,993,894 | B2 | 2/2006 | Greenhoe | |
| 7,024,845 | B2 | * 4/2006 | Kallevig et al. | ............... 56/17.4 |
| 7,059,109 | B2 | 6/2006 | Samejima et al. | |
| 7,086,215 | B2 | 8/2006 | Hensley et al. | |
| 7,263,819 | B2 | 9/2007 | Samejima et al. | |
| 2005/0066642 | A1 | 3/2005 | Sugden et al. | |
| 2006/0144029 | A1 | 7/2006 | Kallevig et al. | |

* cited by examiner

*Primary Examiner*—Alicia M Torres
(74) *Attorney, Agent, or Firm*—The Webb Law Firm

(57) ABSTRACT

The lawn mower includes a vehicle body supporting front and rear wheels and a mower unit suspended from the vehicle body between the front and rear wheels by front and rear links. The links are movable to raise and lower the mower unit. A grass striping mechanism is associated with the vehicle body. The mechanism includes a stay arm connected to the mower unit and a roller support member movably connected to the stay arm so that the member is capable of movement in a vertical direction. A grass striping roller is rotationally supported by the roller support arm. A lift link is pivotally connected to the vehicle body and is associated with the roller support member. The lift link interfaces with the rear link such that upward movement of the rear link imparts movement to the lift link and roller support arm to lift the roller from the ground.

19 Claims, 23 Drawing Sheets

LAWN MOWER WITH GRASS STRIPING MECHANISM

CROSS REFERENCE TO RELATED APPLICATION

This application claims priority to U.S. Provisional Application No. 60/827,772, entitled "Lawn Mower with Grass Striping Mechanism", filed on Oct. 2, 2006. This application contains subject matter disclosed in U.S. patent application Ser. No. 10/649,332, now U.S. Pat. No. 7,059,109, the disclosure of which is incorporated herein by reference.

BACKGROUND OF THE INVENTION

1. Field of the Invention

This invention relates generally to lawn mowers and, further, lawn mowers with a grass striping mechanism used to impart distinctive patterns on lawns and sports playing fields.

2. Description of Related Art

In the area of lawn and sports playing field maintenance, grass striping is a common practice, generally used in combination with cutting grass, whereby the grass on a lawn or field is bent in a particular direction causing light to be reflected therefrom in order to achieve an aesthetically pleasing appearance. Typically, grass striping is accomplished through the use of rollers. In commercial lawn mower units having front and rear tires and a mower deck having one or more mower blades rotatably disposed therein, such rollers are typically fixedly attached to the commercial lawn mower either at the rear of the mower deck or at the rear end of the mower vehicle body as disclosed in U.S. Pat. Application Publication No. 2005/0066642 to Sugden et al. Striping rollers may also be associated with residential push mowers and are typically attached to the rear end of the mower deck of the mower, as disclosed in U.S. Pat. No. 6,523,335 to Vanderipe and U.S. Pat. No. 5,870,888 to Pugh. The rollers in commercial lawn mowers which are disposed at the rearward end of the mower deck allow the newly cut grass to be immediately bent in a particular direction. Whatever the roller location, after the mower blade(s) cuts the grass, the roller bends the grass in the same direction that the roller is moving. With each pass along the lawn or field, the roller stripes the grass in a band having a width equal to that of the roller. It is noted that, in general, striping rollers provided on lawn mowers, whether of commercial or residential varieties, have traditionally been fixedly attached to the rear end of the mower deck as disclosed in U.S. Pat. No. 6,047,530 to Bednar and U.S. Pat. Nos. 7,086,215 and 6,928,798 to Hensley et al. In addition, such rollers are often mounted to the mower deck in a static position above the ground in order to provide ground clearance and accommodate the contours of the lawn or field being mowed. Consequently, the rollers, in these prior art mechanism, do not sit directly on the grass and the resultant bend imparted thereto is often minimal and insufficient to obtain the desired visual effect.

Typical striping mechanisms often have heavy rollers that are, as indicated, rigidly fixed or mounted to the mower or cutting deck to ensure that sufficient downward force is applied to produce the desired striping effect. However, such heavy, full-width rollers may inadvertently, and often do, strike ground surfaces or obstacles during operation, resulting in potential damage to the lawn surface and/or the roller. Accordingly, current striping mechanisms generally lack adjustability and, in operation, typically apply their full force or weight to the grass regardless of particular grass and ground conditions. In order to change the applied downward pressure of the striping roller complete removal or loosening and repositioning of the mechanism is often required, typically with the use of hand tools. To overcome such disadvantages, some striping mechanisms replace the heavy striper roller with a rubber wiper member as disclosed in U.S. Pat. No. 7,024,845 to Kallevig or use a brush striper member as disclosed in U.S. Pat. No. 6,832,468 to Weinlader. In order to overcome weight and rigidity problems associated conventional one-piece striper rollers, some inventors have proposed using multiple rollers individually mounted on a shaft as a replacement to a one-piece striper roller as disclosed in U.S. Pat. Nos. 6,962,039 and 6,993,894 to Greenhoe.

A recent advance in riding mowers relates to commercial and residential lawn mowers that incorporate a turning feature or a zero-turning radius, whereby, upon turning, the inner tire on the inside of the turn radius rotates backward while the outer tire on the outside of the turning radius rotates forward. However, upon turning, a striper roller fixedly disposed between the mower deck and the rear tires in such a vehicle is forced to travel in a direction perpendicular to its axis of rotation. As a result, the striper roller often becomes wedged in the grass, thereby inhibiting the lawn mower from preventing the turn. Accordingly, it has been particularly technically challenging to provide a striper mechanism that is suitable for use on such "zero-turn" mowers.

SUMMARY OF THE INVENTION

In one embodiment, a lawn mower is disclosed comprising a vehicle body comprising a pair of front wheels and a pair of rear wheels and a mower unit mounted to the vehicle body between the front wheels and rear wheels. The mower unit is suspended from the vehicle body by links and the links are movable to raise and lower the mower unit relative to ground level. The lawn mower may be provided a grass striping mechanism. In one aspect, the grass striping mechanism is associated with the vehicle body.

Generally, the grass striping mechanism comprises a stay arm connected to the mower unit, a roller support member movably connected to the stay arm such that the roller support member is capable of movement having at least a generally vertical component relative to ground level, a grass striping roller rotationally supported by the roller support arm, and a lift link connected to the vehicle body and associated with the roller support member. The lift link is generally adapted to interface with at least one of the links such that upward movement of the at least one link imparts movement to the lift link and the roller support arm to lift the grass striping roller from contact with the ground.

The stay arm may comprise a guide tube and the roller support member is axially received in the guide tube. The lift link may comprise a portion defining an aperture through which an upper end portion of the roller support member extends. The aperture may be in the form of an elongated slot such that the roller support member is capable of movement having a generally horizontal component relative to ground level. The lift link may be pivotally connected to the vehicle body. The upper end portion of the roller support member may comprise an interference structure adapted to be engaged by the lift link to effect lifting of the roller support member in a generally vertical direction. Moreover, a spring extending between the mower unit and lift link may be provided to exert a biasing force applying downward pressure on the grass striping roller. An abutment member may be provided on the lift link. The abutment member may extend from the lift link and be positioned for interference engagement with the at least one link. The interference engagement imparts movement to the lift link and the roller support arm to lift the grass striping roller from contact with the ground. The grass striping roller typically has a length approximately equal to the distance between the rear wheels.

In another embodiment, the lawn mower comprises a front frame unit supporting a pair of front wheels, a rear frame unit connected to the front frame unit and supporting a pair of rear wheels and a mower unit suspended from the front frame unit by front and rear links. The front and rear links are movable to raise and lower the mower unit relative to ground level. In this embodiment, a grass striping mechanism may also be provided and be associated with the rear frame unit and mower unit.

Generally, the grass striping mechanism comprises a stay arm connected to the mower unit, a roller support member movably connected to the stay arm such that the roller support member is capable of movement having at least a generally vertical component relative to ground level, a grass striping roller rotationally supported by the roller support arm, and a lift link connected to the rear frame unit and associated with the roller support member. The lift link is adapted to interface with the rear link such that upward movement of the rear link imparts movement to the lift link and the roller support arm to lift the grass striping roller from contact with the ground.

The stay arm may comprise a guide tube and the roller support member is axially received in the guide tube. The lift link may comprise a portion defining an aperture through which an upper end portion of the roller support member extends. The aperture may be in the form of an elongated slot such that the roller support member is capable of movement having a generally horizontal component relative to ground level. The lift link may be pivotally connected to the rear frame unit. An upper end portion of the roller support member may comprise an interference structure adapted to be engaged by the lift link to effect lifting of the roller support member in a generally vertical direction. Moreover, a spring extending between the mower unit and lift link may be provided to exert a biasing force applying downward pressure on the grass striping roller. An abutment member may be provided on the lift link. The abutment member may extend from the lift link and be positioned for interference engagement with the rear link. The interference engagement imparts movement to the lift link and the roller support arm to lift the grass striping roller from contact with the ground.

A further feature of the lawn mower embodiments relates to a hydraulic cylinder that is coupled to the at least one link or rear link and is adapted to cause upward movement of the at least one link or rear link to raise and lower the mower unit. The at least one link or rear link may be coupled to the hydraulic cylinder by a drive arm such that extension of the hydraulic cylinder induces upward pivotal movement of the at least one link or rear link via the drive arm.

Other features and advantages will be clear from the following description read in conjunction with the accompany drawings, wherein like parts are designated with like reference numerals throughout.

DESCRIPTION OF THE PREFERRED EMBODIMENTS

For purposes of the description hereinafter, spatial orientation terms, if used, shall relate to the referenced embodiment as it is oriented in the accompanying drawing figures or otherwise described in the following detailed description. However, it is to be understood that the embodiments described hereinafter may assume many alternative variations and configurations. It is also to be understood that the specific devices illustrated in the accompanying drawing figures and described herein are simply exemplary and should not be considered as limiting.

Figure 1:
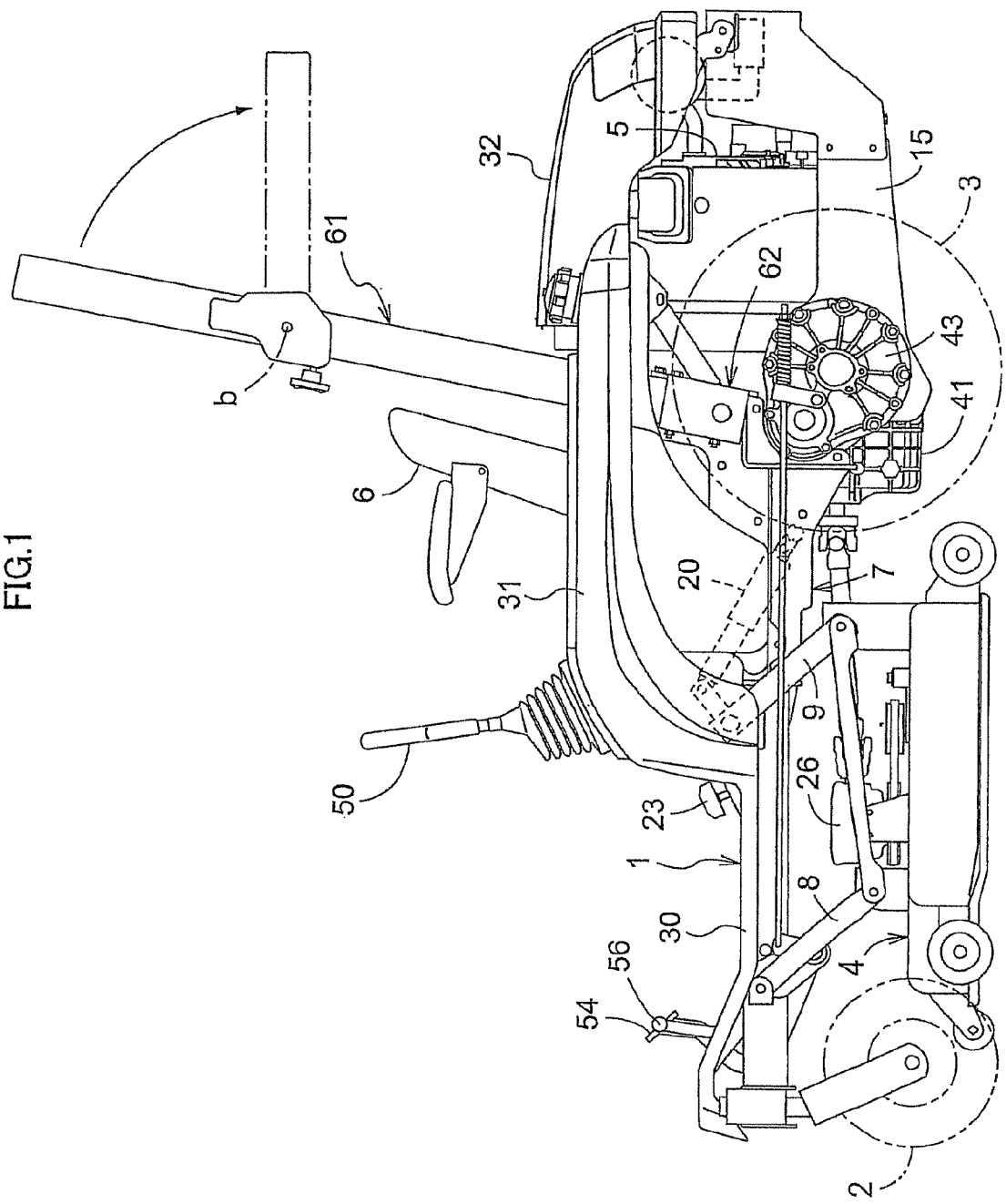
FIG. 1 is a left side view of a lawn mower.
Figure 2:
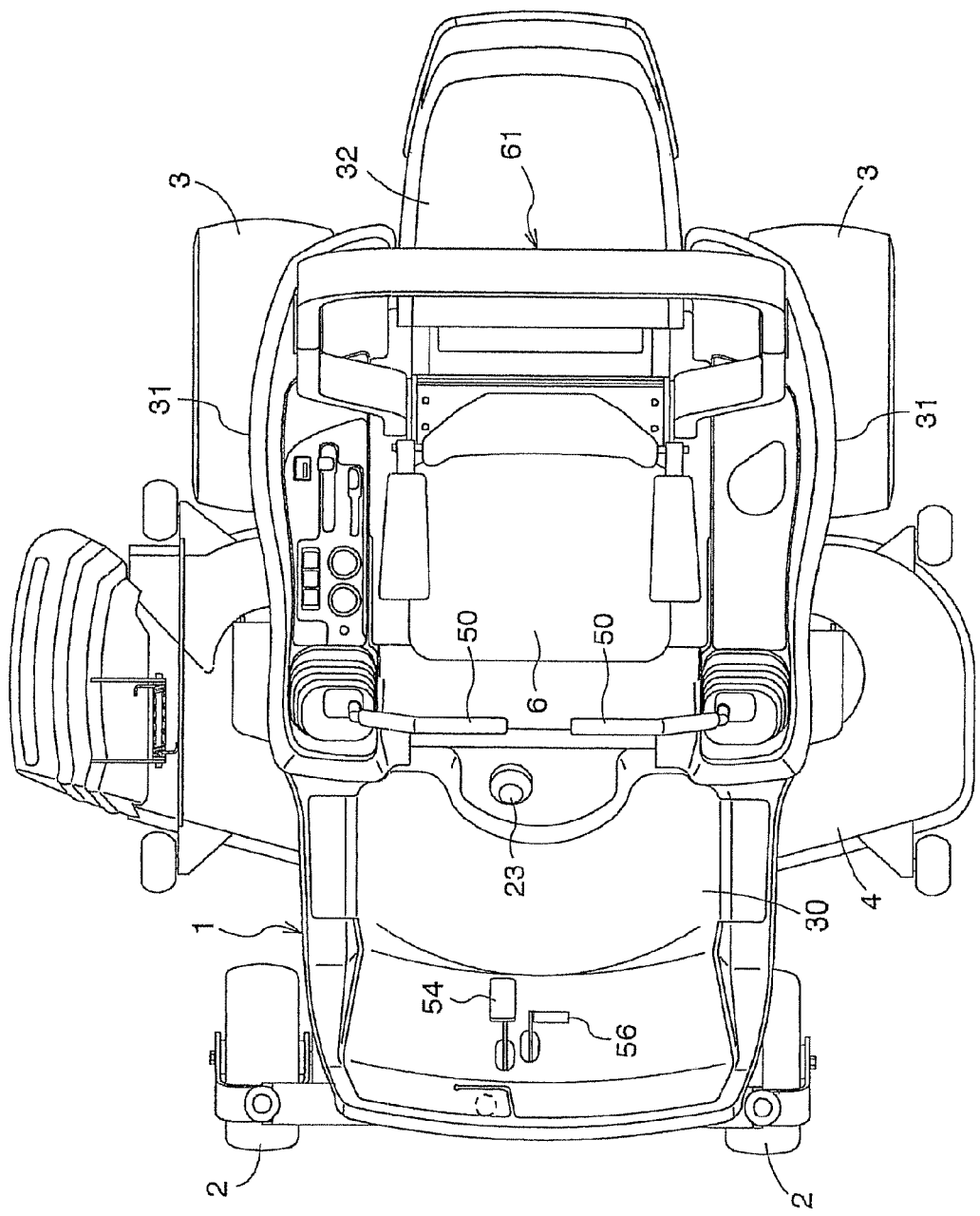
FIG. 2 is a plan view of the lawn mower.

FIGS. 1-2 show a riding lawn mower with a mid-mount mower unit according to one exemplary embodiment. In the depicted lawn mower, the lawn mower comprises a vehicle body 1 having a pair of right and left front wheels 2 and right and left rear wheels 3, and a mower unit 4 vertically and movably suspended between the front and rear wheels 2, 3. An engine 5 is mounted at a rear portion of the vehicle body 1 and a driver's seat 6 is disposed at middle portion of the vehicle body 1 substantially along a longitudinal central axis or direction of the vehicle body 1. The pair of right and left front wheels 2 is desirably in the form of freely rotatable caster-type wheels, and the pair of right and left rear wheels 3 are drive wheels independently and steplessly changeable in speed and switchable between forward drive and backward drive. By driving both rear wheels 3 at the same speed forward or backward, the lawn mower may be controlled to run forward or backward, and by driving the right and left rear wheels 3 at different speeds the lawn mower may be controlled to turn in any direction.

Figure 3:
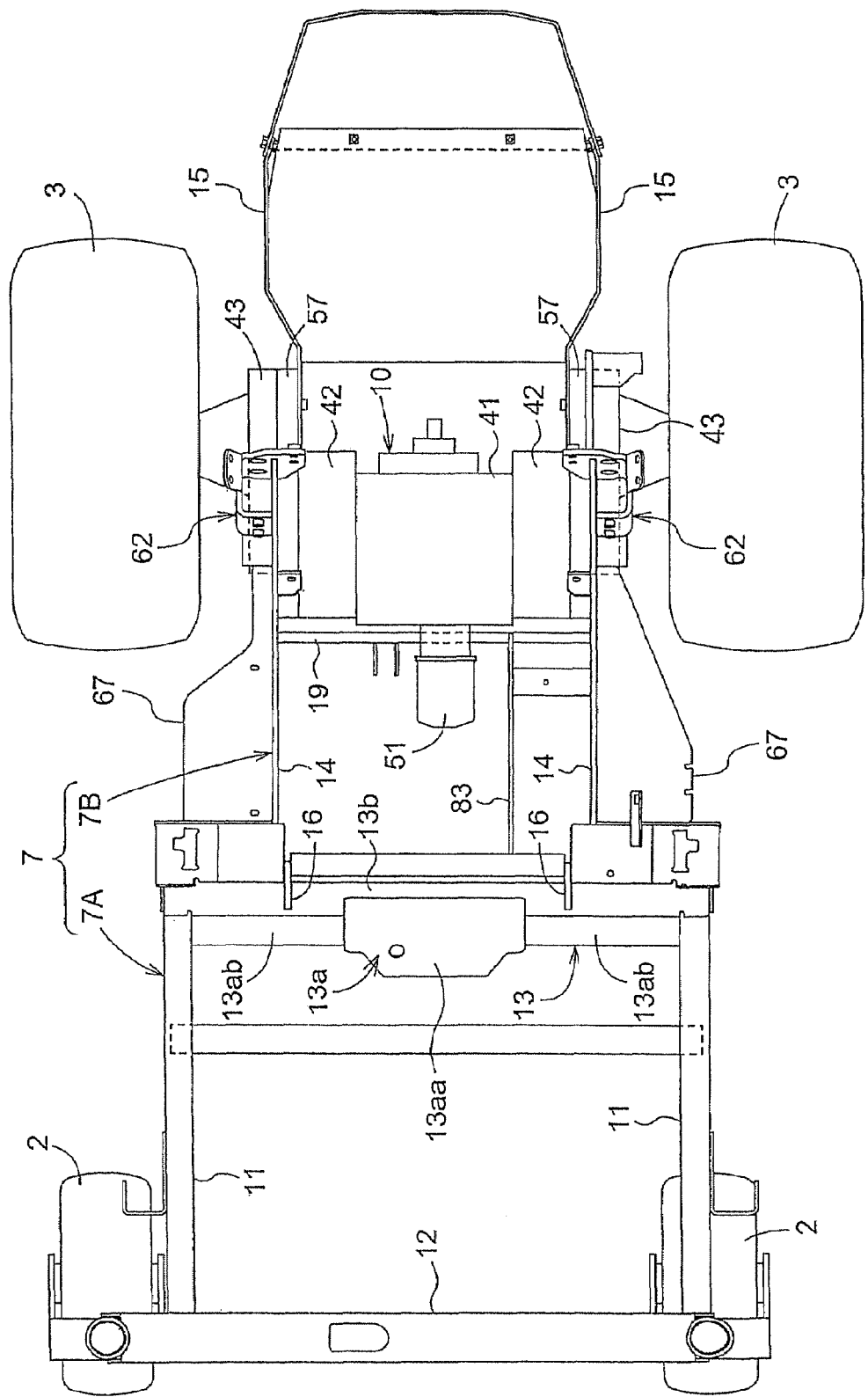
FIG. 3 is a plan view of a body frame assembly of the lawn mower.
Figure 4:
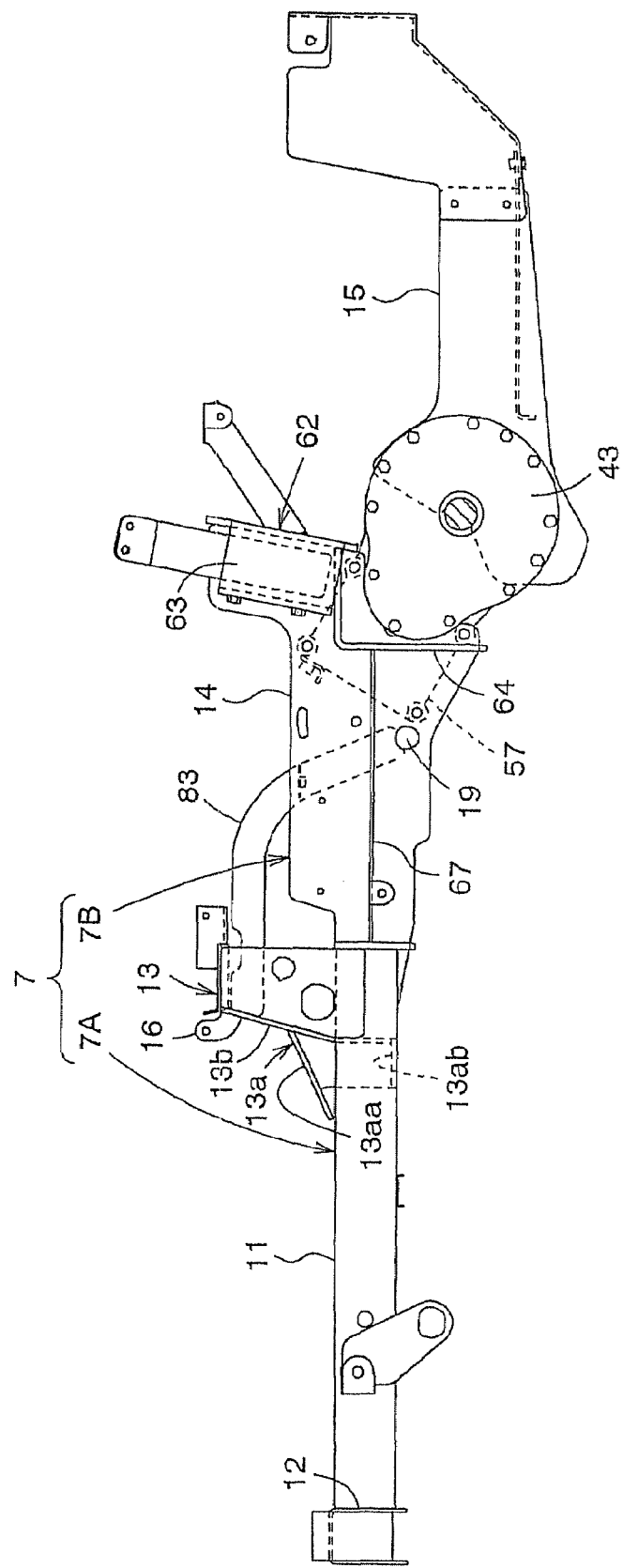
FIG. 4 is a side view of the body frame assembly of the lawn mower.

As shown in FIGS. 3-4, a body frame assembly 7 of the vehicle body 1 consists of a front frame unit 7A supporting the front wheels 2 and suspending the mower unit 4 through front and rear links 8 and 9, and a rear frame unit 7B having a rear wheel drive section 10 connected thereto. The front frame unit 7A includes a pair of right and left front longitudinal frames 11 composed of channels opposed to each other with a wide spacing therebetween, a first cross frame 12 composed of a channel interconnecting front ends of the right and left front longitudinal frames 11, and a second cross frame 13 interconnecting rear ends of the right and left front longitudinal frames 11. The rear frame unit 7B includes a pair of right and left rear longitudinal frames 14 composed of flat plates arranged with a smaller spacing therebetween than that of the front frame unit 7A and connected to the second cross frame 13. The rear wheel drive section 10 is connected to rear ends of the longitudinal frames 14. The engine 5, which is typically an air-cooled gasoline engine, is mounted, with an output axis thereof extending in the longitudinal direction, on an engine-mounting frame 15 extending rearward from the rear wheel drive section 10.

Figure 5:
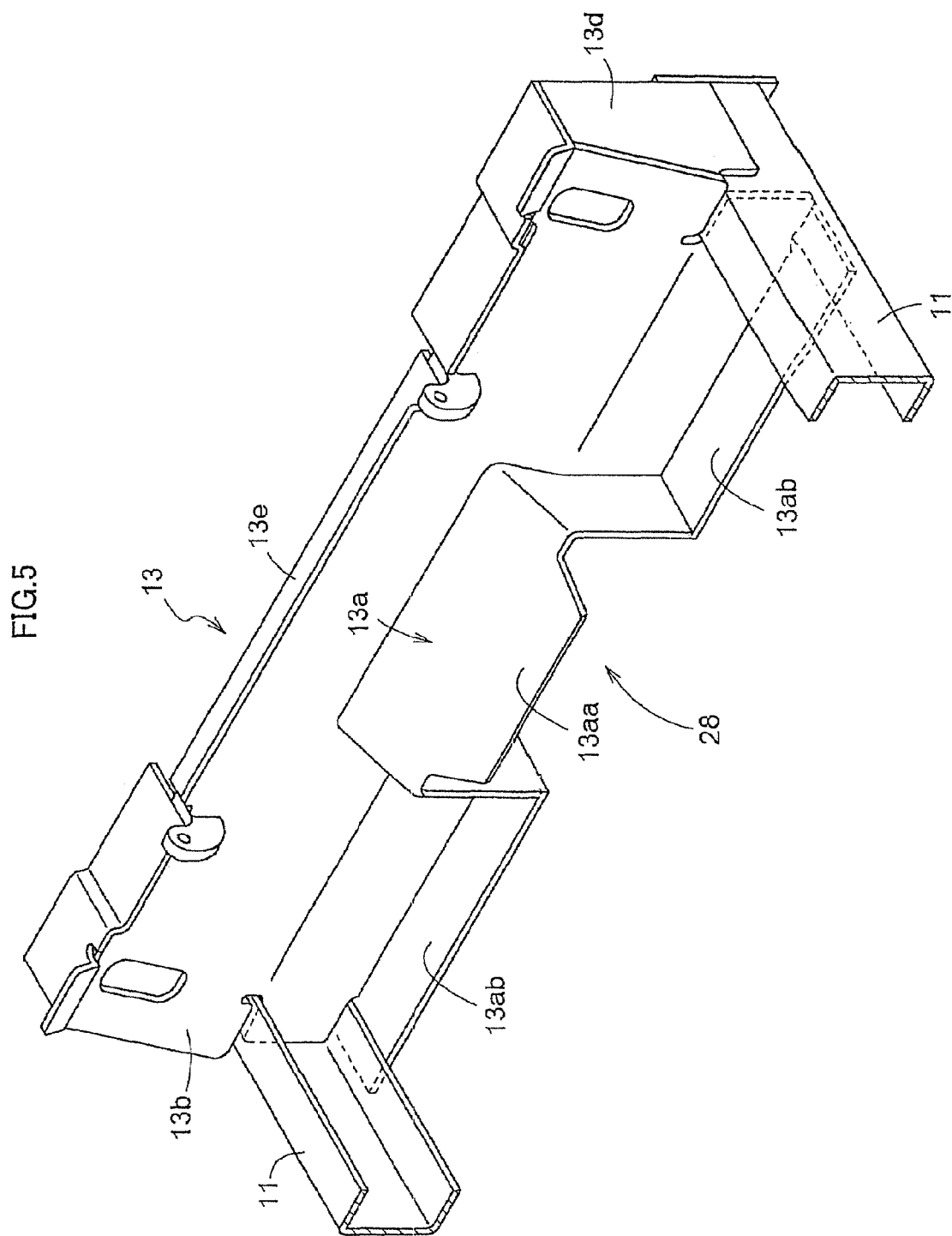
FIG. 5 is a perspective view of a second cross frame of the lawn mower.

As shown in detail in FIG. 5, the second cross frame 13 is a welded metal plate structure protruding above the front longitudinal frames 11, including a first profile member 13a having a gate-shape portion 13aa defining a recess 28 and horizontal plate portions 13ab connected to lower ends of the gate shape-portion, a tilted vertical plate member 13b connected to a rear end face of the first profile member 13a, a rear wall member 13e connected to the rear end of the tilted plate member 13b to create therewith an internal space extending transversely of the vehicle body, and side plates 13d for covering the internal space from lateral directions. An upper part of a transversely middle portion of the tilted plate member 13b forming the second cross frame 13 is connected to a stay 19 through an arch-shaped reinforcing plate 83.

Figure 6:
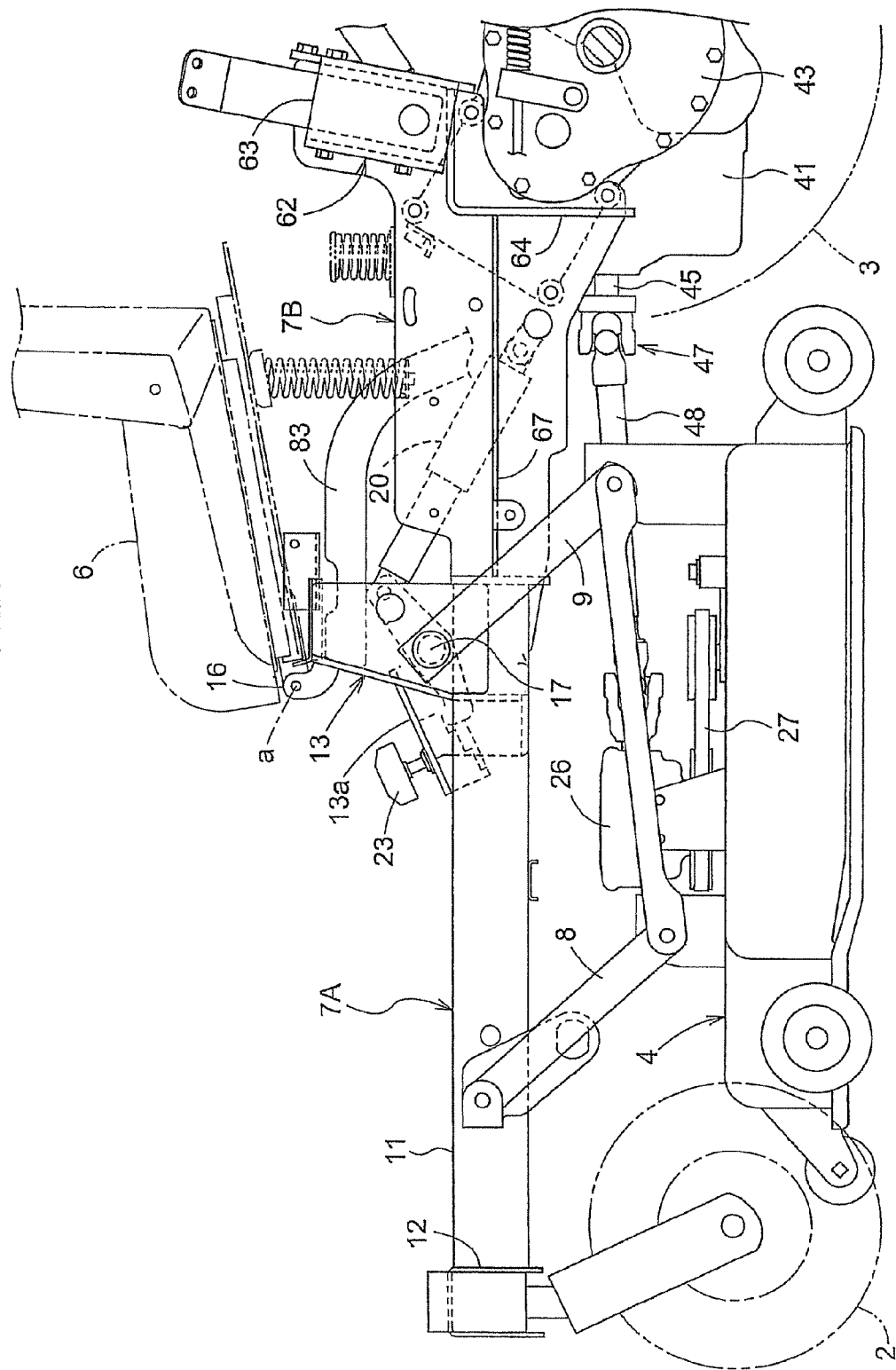
FIG. 6 is a side view of the lawn mower showing a mower-unit mounting section with a mower unit in a lowered position.
Figure 7:
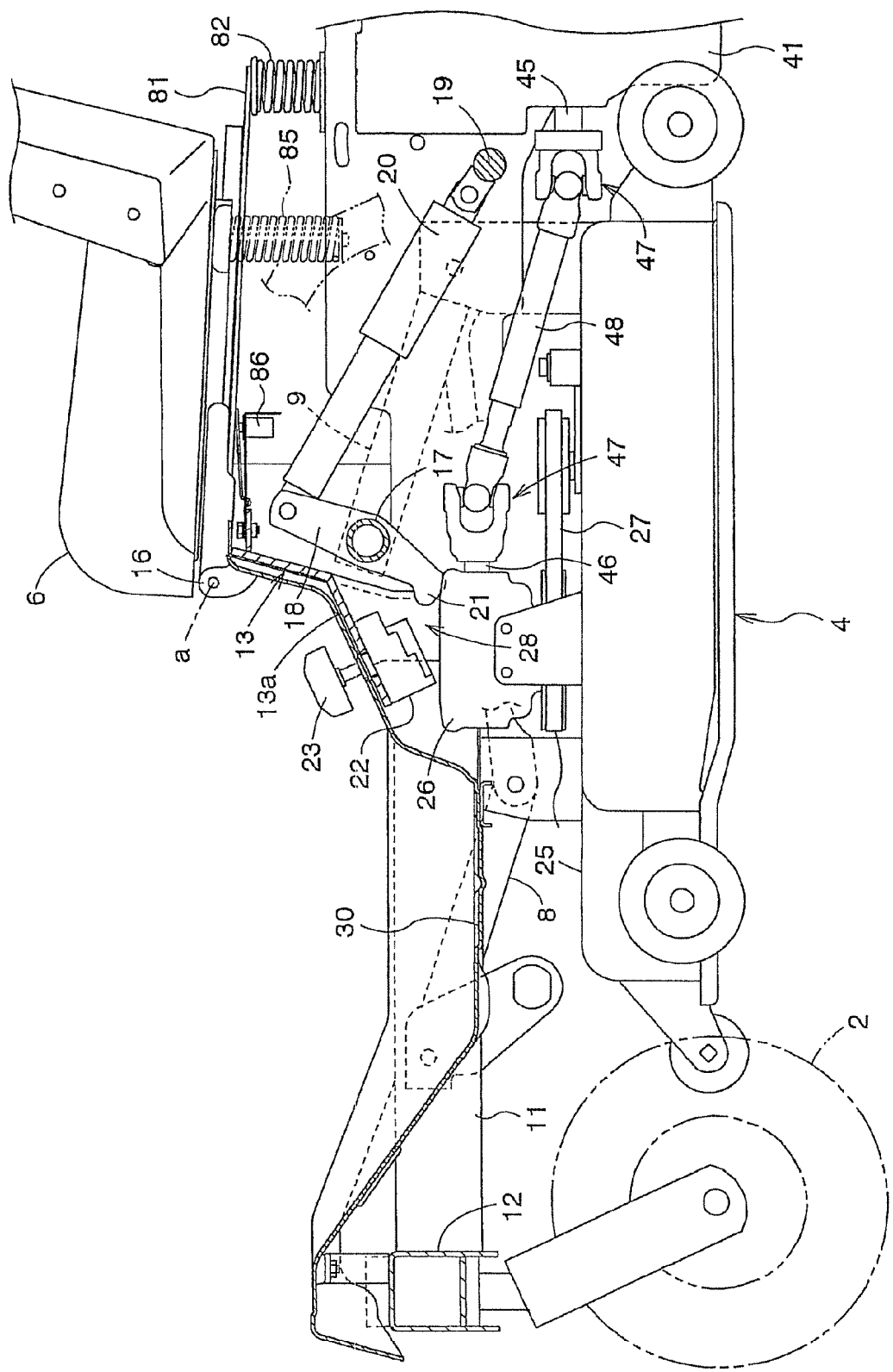
FIG. 7 is a side view of the lawn mower showing the mower-unit mounting section with the mower unit in a raised position.
Figure 8:
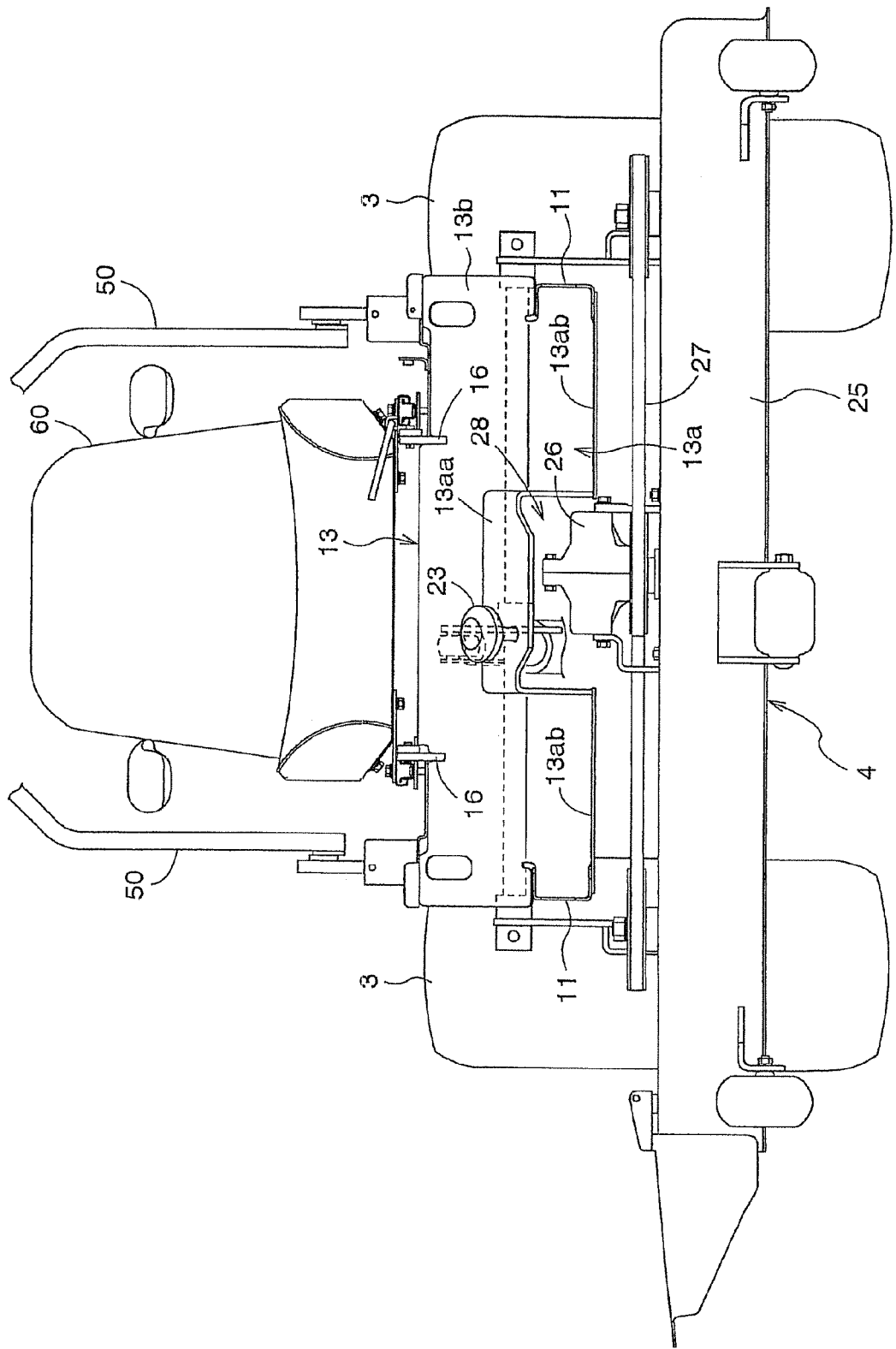
FIG. 8 is a front view of the lawn mower showing the mower-unit mounting section with the mower unit in the raised position.

As shown in FIGS. 6-8, the tilted plate member 13b forming the second cross frame 13 has fulcrum metal fittings 16 disposed on front parts thereof for supporting the driver's seat 6 to be pivotal about an axis "a". The driver's seat 6 is placed above the rear frame unit 7B so that the front end thereof reaches above the second cross frame 13.

A support shaft 17 extending transversely through the internal space of and supported by the second cross frame 13 is connected to upper ends of the rear links 9 for suspending the mower unit 4. A single-acting hydraulic cylinder 20 is mounted between a drive arm 18 fixed to the support shaft 17 and the stay 19 interconnecting the right and left rear longitudinal frames 14. When the hydraulic cylinder 20 is extended by pressure oil supplied thereto, the rear links 9 are swung upward to raise the mower unit 4, and when the hydraulic cylinder 20 is contracted by the pressure oil drained therefrom, the mower unit 4 descends by gravity but in a controlled manner. A restraining arm 21 extending from the drive arm 18 limits the descent of the mower unit 4 by abutting on a stopper 22 having stepped contacts formed by a spiral. The stopper 22 may be turned by a knob 23 to change a contact position stepwise to receive the restraining arm 21, thus adjusting the height of the suspended mower unit 4 relative to the ground and, as a result, the cutting height.

The mower unit 4 is constructed so that three blades (as an example and not shown) are driven to rotate about vertical axes which are transversely arranged in a deck 25 and grass clippings are discharged through the right end of the deck 25. A gear case 26 is centrally disposed on the upper face of the deck 25 and changes torque inputted from rearward into rotation about a vertical axis for transmission to each blade through a drive belt 27.

As shown in FIGS. 7-8, when the mower unit 4 is raised, the gear case 26 and/or a universal joint 47 may enter the downwardly opened recess 28 defined by the gate-shape portion 13aa positioned in a transversely middle region of the first profile member 13a forming the second cross frame 13. In this way, the mower unit 4 may be raised to a large extent to secure a good height over the ground.

Figure 9:
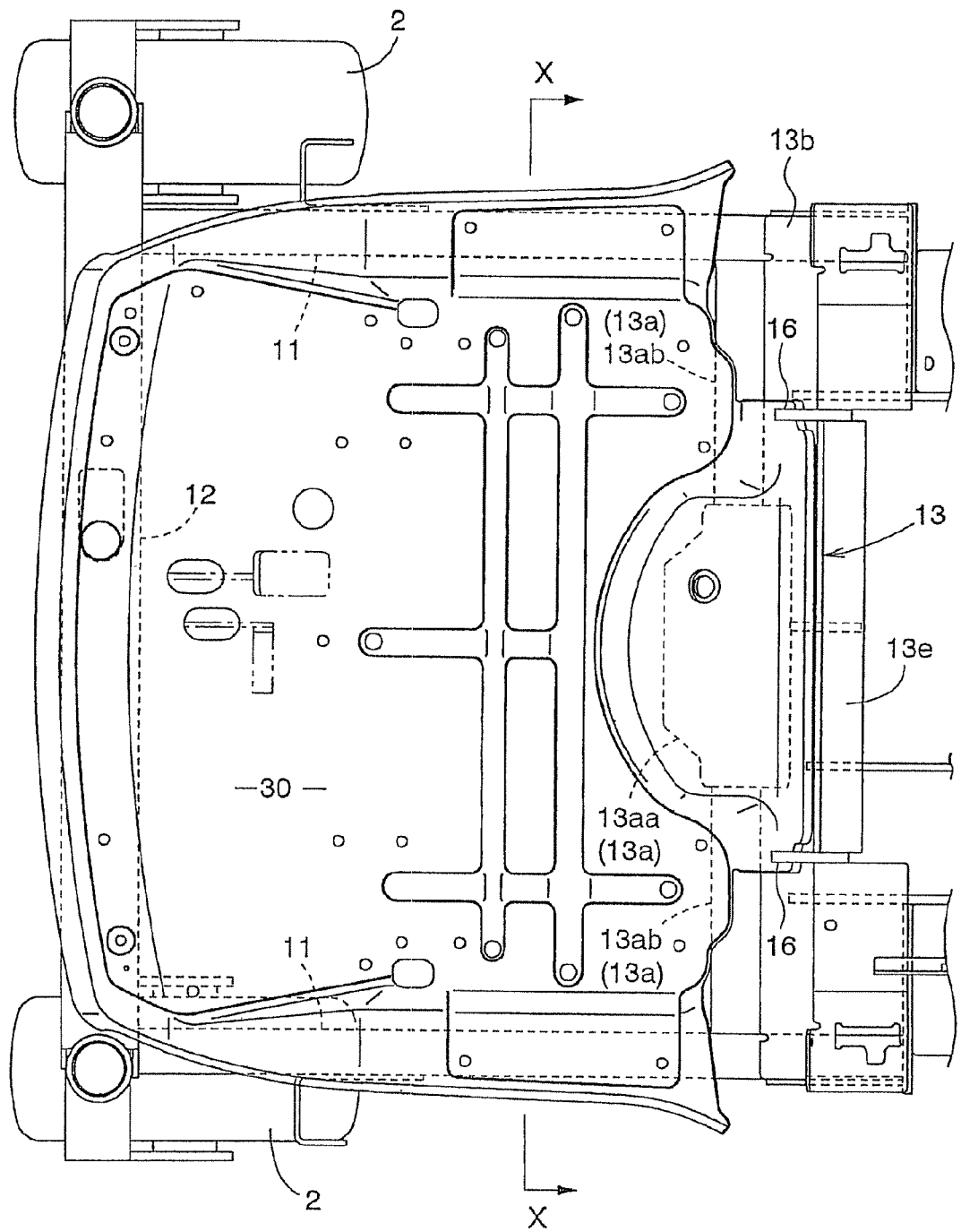
FIG. 9 is a plan view of a forward portion of the body frame assembly of the lawn mower.
Figure 10:
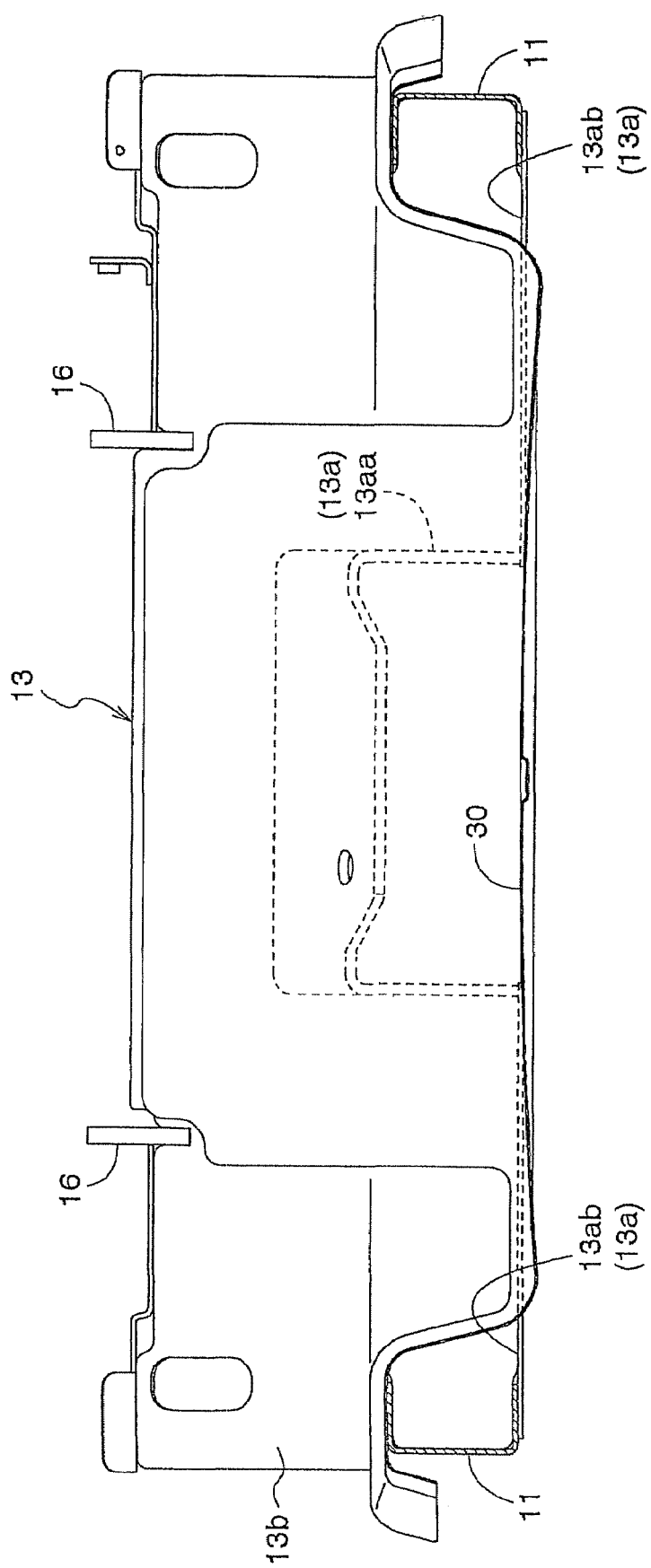
FIG. 10 is a cross-sectional view taken along line X-X of FIG. 9.

A footboard 30 made of metal plate is fitted to the front frame unit 7A of the body frame assembly 7 in a position under the driver's feet. A pair of rear wheel fenders 31 are disposed, respectively, at the right and left sides of the driver's seat 6. An engine hood 32 is provided behind the driver's seat 6. Further, as shown in FIGS. 9-10, the footboard 30 mounted to cover the front frame unit 7A is pressed to a shape having a sunken portion between the right and left front longitudinal frames 11 and, thus, the footboard level is low enough to allow the driver to be seated a well-balanced condition with a low center of gravity. Rear end portions of the footboard 30 are mounted on and connected to the horizontal plate portions 13ab of the first profile member 13a forming the second cross frame 13. The middle part at the rear end of the footboard 30 is bulged along the shape of the gate-shape portion 13aa of the first profile member 13a to fittingly cover the gate-shape portion 13aa.

Figure 11:
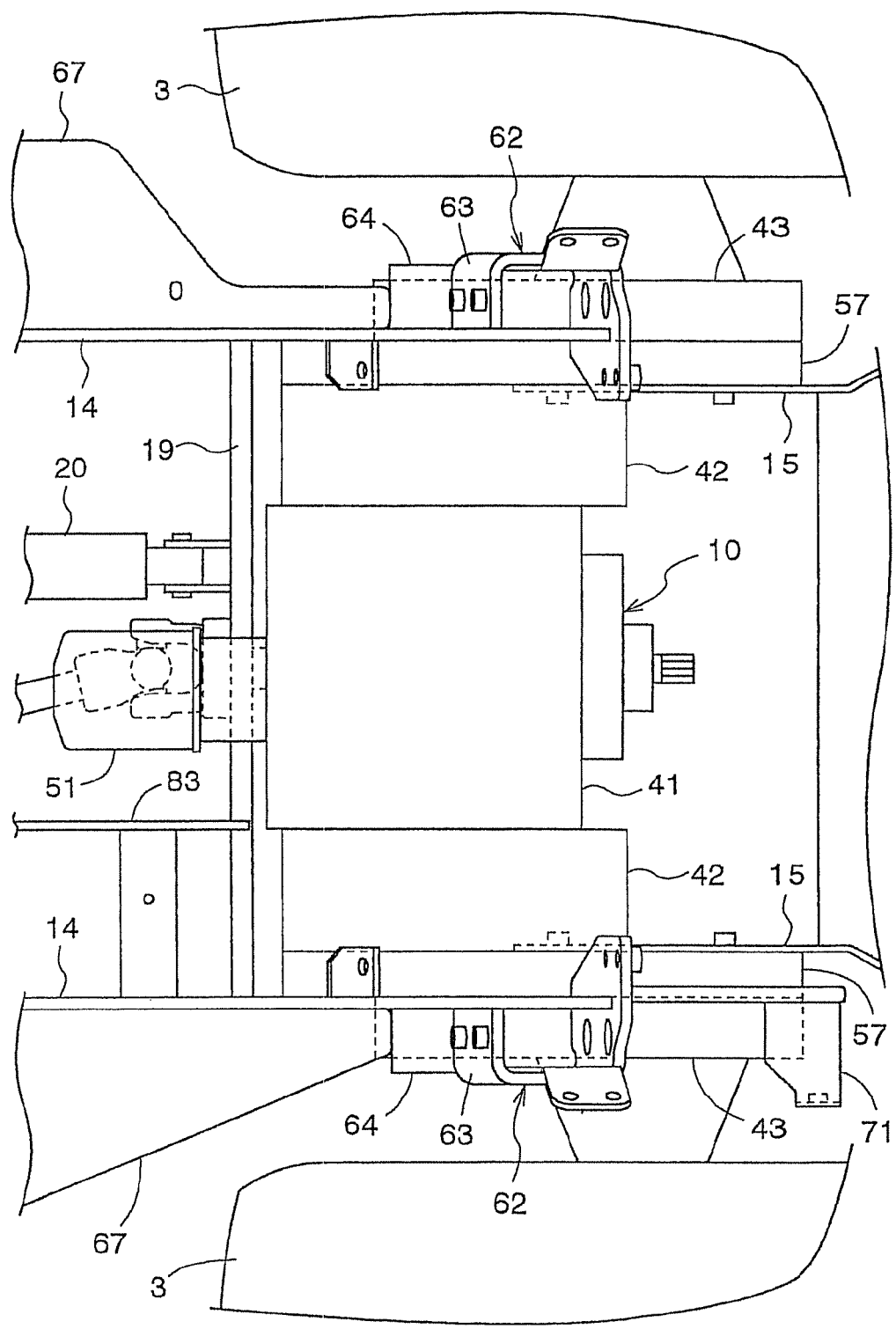
FIG. 11 is a plan view showing a rear wheel drive section of the lawn mower.
Figure 12:
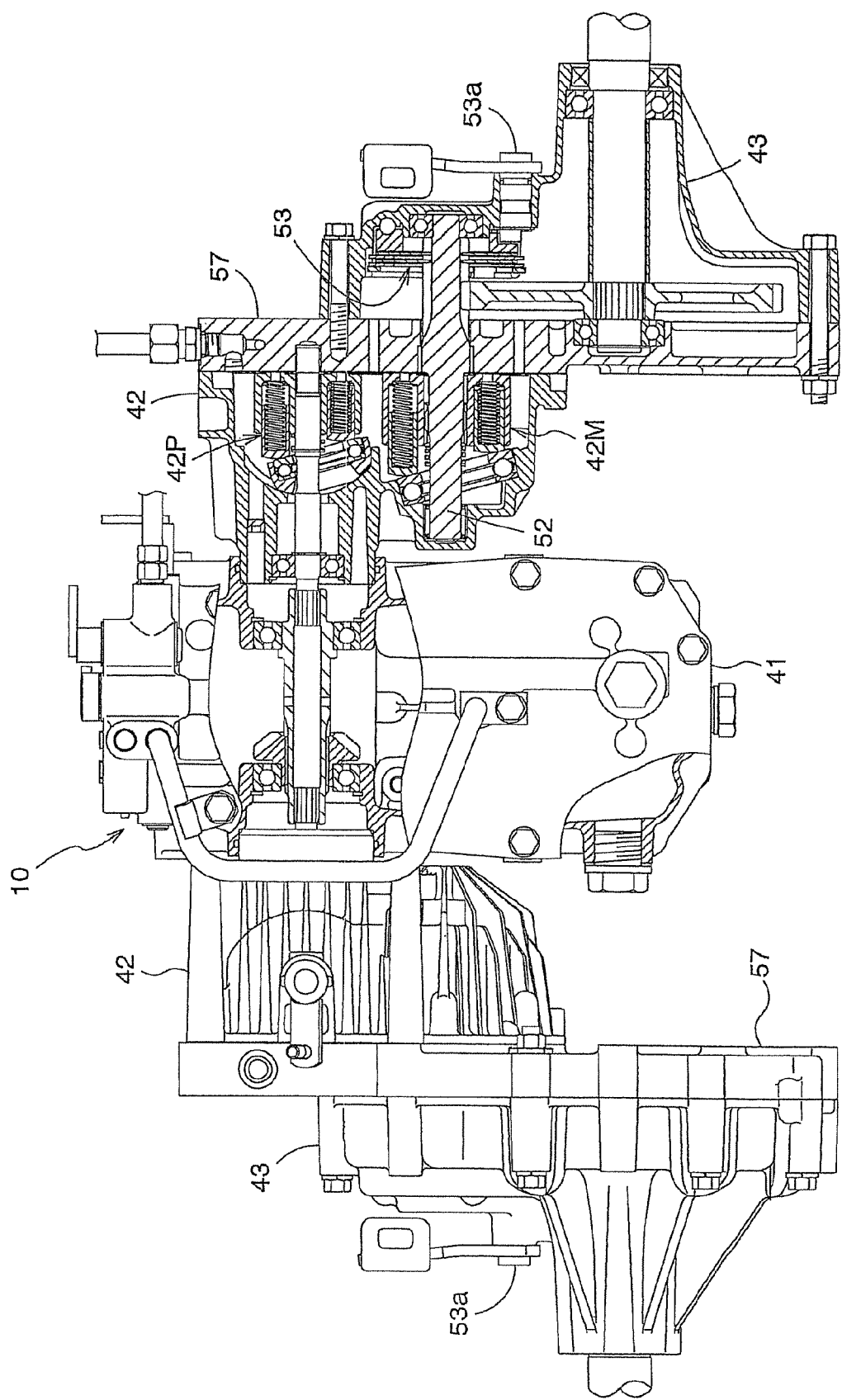
FIG. 12 is a rear view, partly in section, of the rear wheel drive section of FIG. 11.
Figure 13:
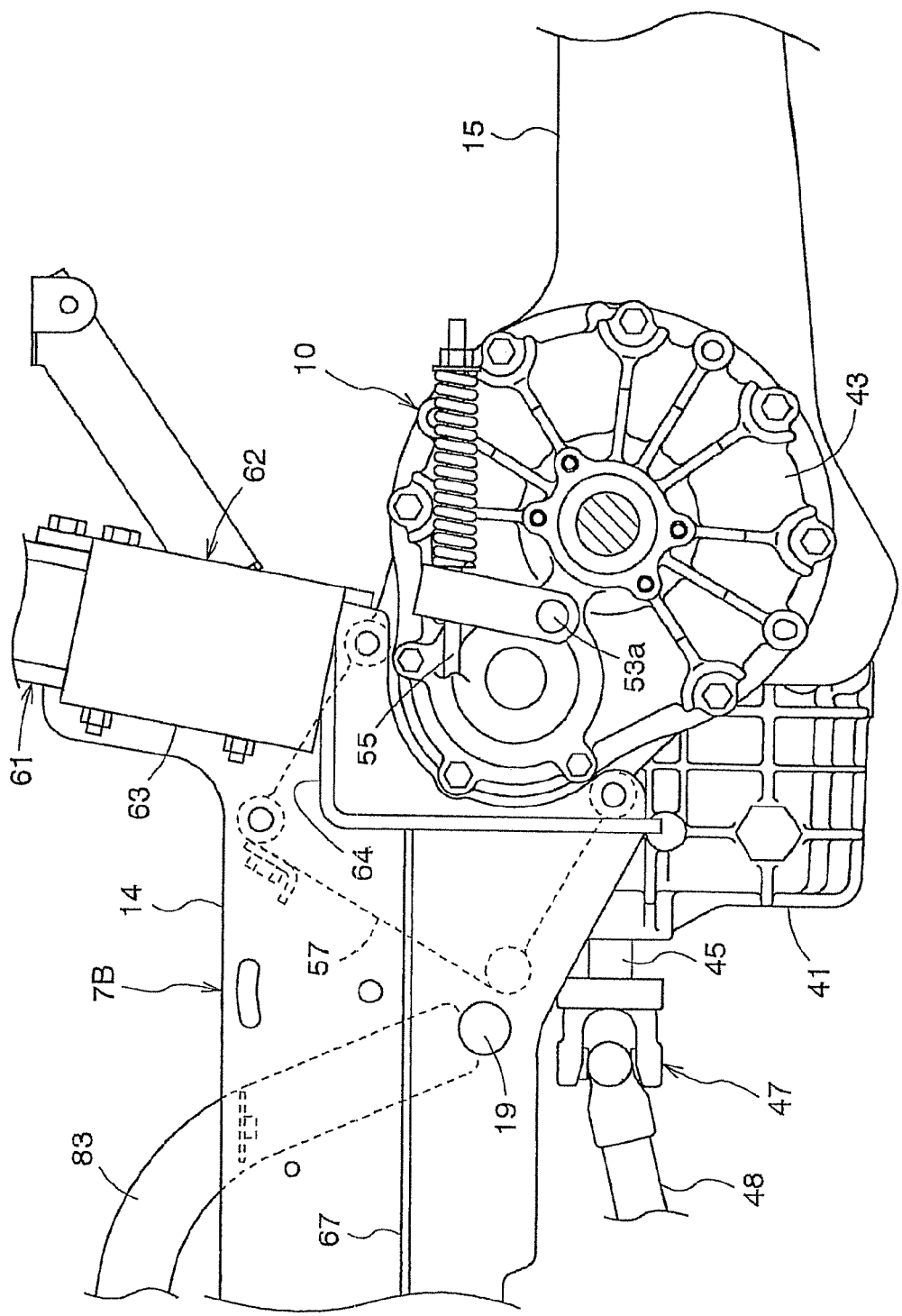
FIG. 13 is a left side view of the rear wheel drive section of FIG. 11.

As shown in FIGS. 11-13, the rear wheel drive section 10 includes a central transmission case 41 for receiving output from the engine 5, a pair of hydrostatic stepless transmissions (HST) 42 attached to right and left sides of the central transmission case 41, and a pair of right and left reduction cases 43 supporting the axles of rear wheels 3. Engine power inputted to the central transmission case 41 through its rearward part is divided and transmitted to right and left variable displacement pumps 42P of stepless transmissions 42. Outputs in varied speeds from motors 42M of the stepless transmissions 42 are decelerated through the reduction cases 43 and transmitted to the axles of the rear wheels 3. A PTO shaft 45 projects forward from the front face of the central transmission case 41, to be operatively connected to a rearwardly projecting input shaft 46 of the gear case 26 through a pair of universal joints 47 and a transmission shaft 48.

The hydrostatic stepless transmissions 42 employed herein are the well-known axial plunger type, with the swash plate angle of each pump 42P variable to vary the volume and direction of oil delivery, whereby the motor 42 may be driven forward and backward in steplessly variable speed. Swash plate angle control shafts, not shown in the drawings, are operatively connected to shift levers 50 arranged at opposite sides of the driver's seat 6 to be rockable backward and forward. The shift levers 50 held in neutral position place the stepless transmissions 42 in neutral stop position. When the shift levers 50 are rocked forward from the neutral position, the stepless transmissions 42 are shifted to forward drive speed positions. When the shift levers 50 are rocked rearward from the neutral position, the stepless transmissions 42 are shifted to backward drive speed positions. In front of the central transmission case 41, an oil filter 51 is disposed on an oil supply line for supplying pressure oil to a charging circuit of hydrostatic stepless transmissions 42. By rocking the driver's seat 6 forward to open the upper part of the rear wheel drive section 10, the oil filter 51 is fully exposed in a position between the pair of right and left rear longitudinal frames 14, and may easily be mounted and dismounted with hands reaching from above.

The right and left reduction cases 43 are provided, respectively, with multiple disk brakes 53 acting on motor shafts 52. Control shafts 53a of the brakes 53 are operatively connected through rods 55 to a brake pedal 54 disposed around a middle forward part of the footboard. The brake pedal 54, when depressed, actuates the right and left brakes 53 at the same time. Further, a brake lock pedal 56 for parking is disposed laterally of the brake pedal 54 to hold the brake pedal 54 in a depressed position.

Port blocks 57, having the hydraulic circuits of the hydrostatic stepless transmissions 42 inside, are formed of high strength castings that also serve as covers for reduction cases 43. To the outward side of each port block 57, the rear end of the rear longitudinal frame 14 forming the rear frame unit 7B of the body frame assembly 7 is connected. To the inward side of each port block 57, the front end of the engine-mounting frame 15 is connected.

Figure 14:
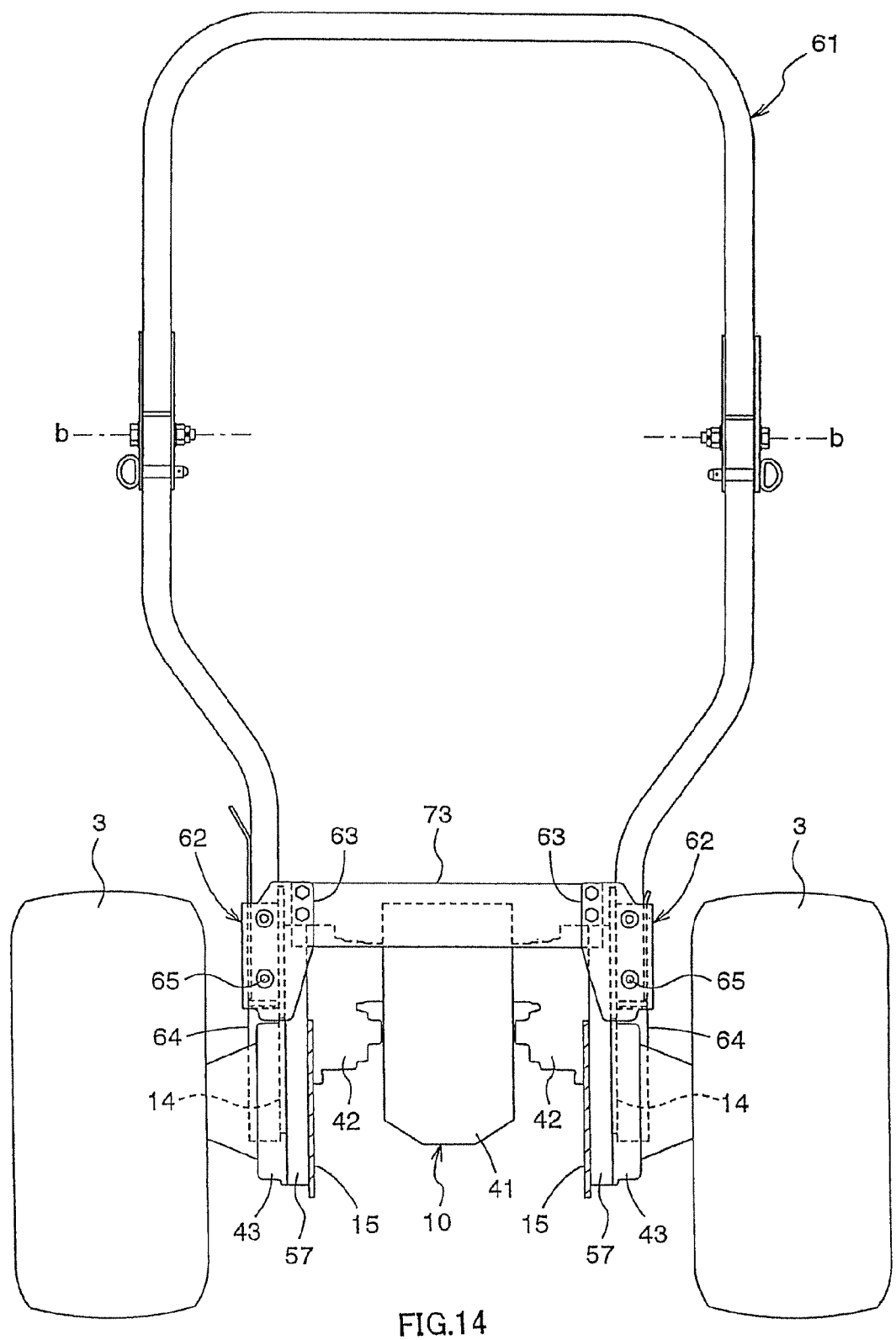
FIG. 14 is a rear view of the lawn mower showing connections of a safety frame for the lawn mower.
Figure 15:
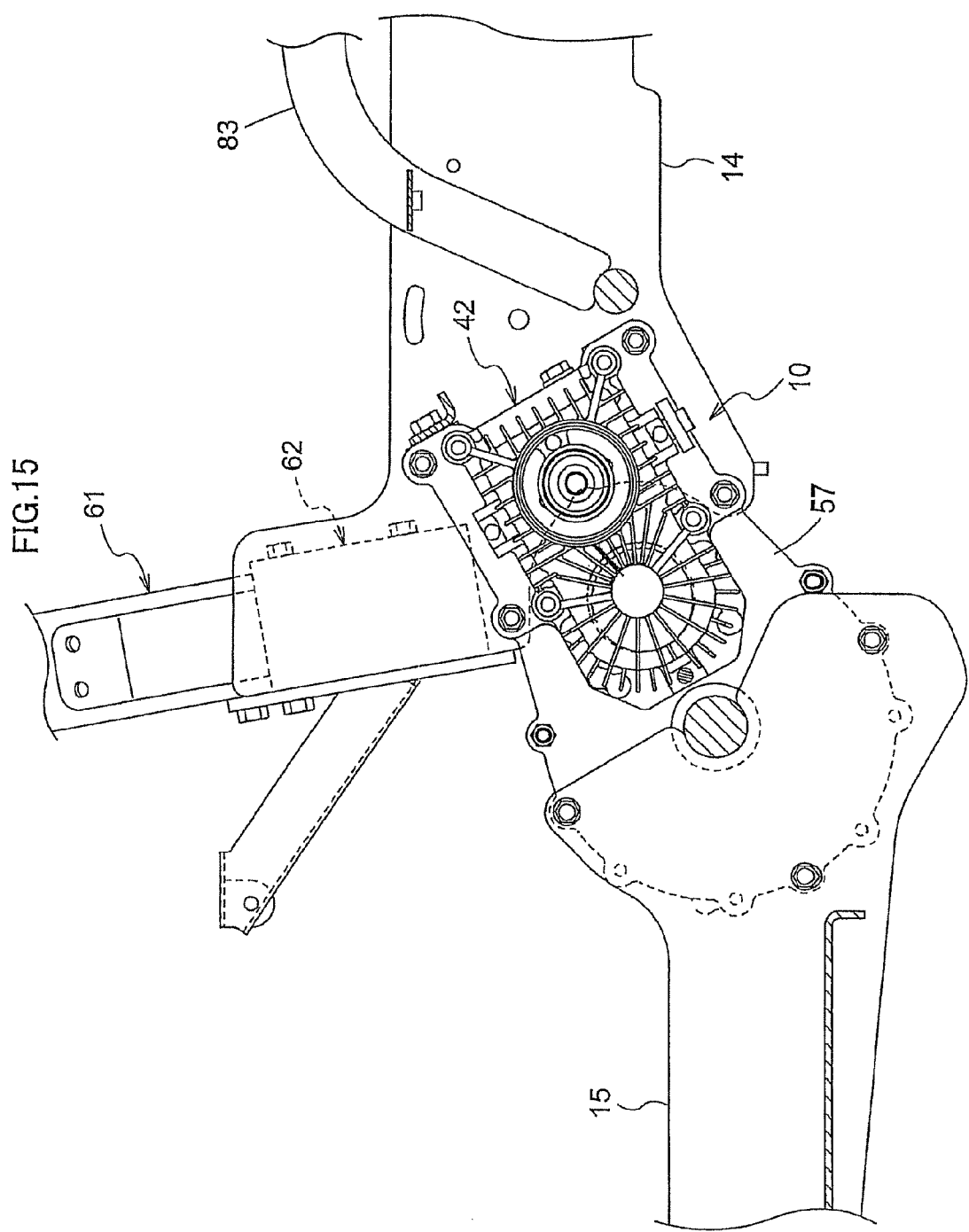
FIG. 15 is a right side view of the rear wheel drive section of FIG. 11.
Figure 16:
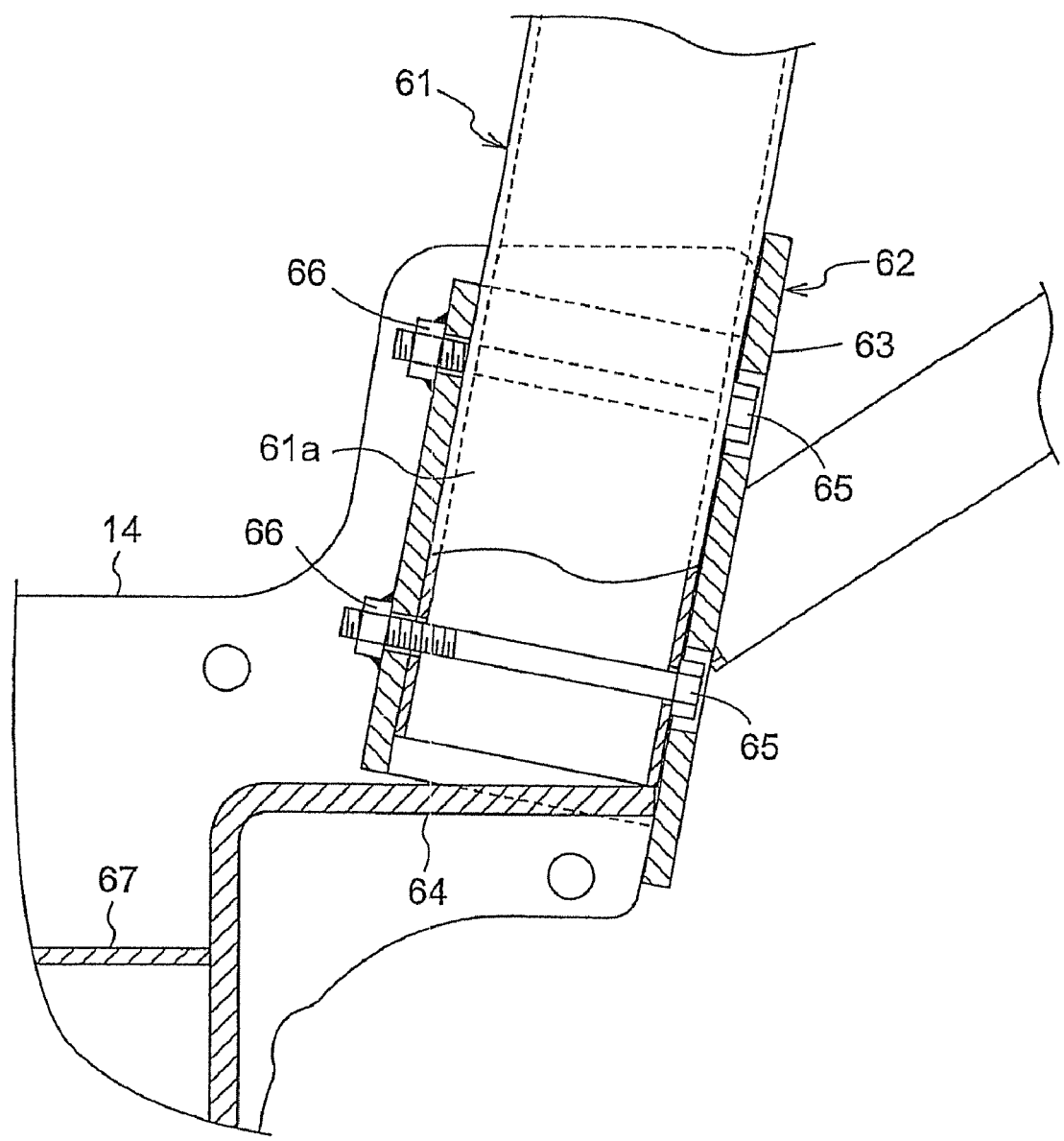
FIG. 16 is a side view, partly in section, showing a left proximal support of the safety frame of FIG. 14.

As shown in FIG. 14, a gate-shaped safety frame 61, foldable backward about an axis "b" in the vertically middle portion thereof, is erected behind the driver's seat 6. The safety frame 61 has right and left proximal pole ends 61a supported by proximal supports 62 disposed on the rear outward surfaces of right and left rear longitudinal frames 14 of the body frame assembly 7. Each proximal support 62, as shown in FIGS. 15-16, includes a square boss member 63 rigidly welded to the outward surface of the rear longitudinal frame 14, and a bottom plate member 64 serving as a reinforcing plate rigidly welded to the outward surface of the rear longitudinal frame 14. A stay 73 interconnects the right and left square boss members 63 of the proximal supports 62 at rear surfaces thereof. With each proximal pole end 61a in the form of a square pipe is inserted from above into the proximal support 62 and received by the bottom plate member 64, bolts 65 inserted from behind through the proximal support 62 and the proximal pole end 61a are screwed into nuts 66 fixed to the front surface of the proximal support 62, whereby the bolt heads push the proximal pole end 61a forward and press it against the forward inner face of the proximal support 62. Thus the safety frame 61 is firmly fixed in its upstanding position. In this case, the bolts 65 may be handled with facility with a large space secured behind the safety frame 61.

A reinforcing member 67 is welded, with its plate surfaces oriented horizontally, to the outer surface of each rear longitudinal frame 14 in order to increase the strength of the frame 14. Further, front and rear ends of this reinforcing member 67 are welded to the rear surface of the second cross frame 13 of the front frame unit 7A and to the bottom plate member 64 of the proximal support 62. The reinforcing members 67 provided in this way strengthen the stepped connections between the two different width frames, typically the wide-width front frame unit 7A and the small-width rear frame unit 7B, and also strengthen the proximal supports 62 for supporting the upstanding safety frame 61.

Figure 17:
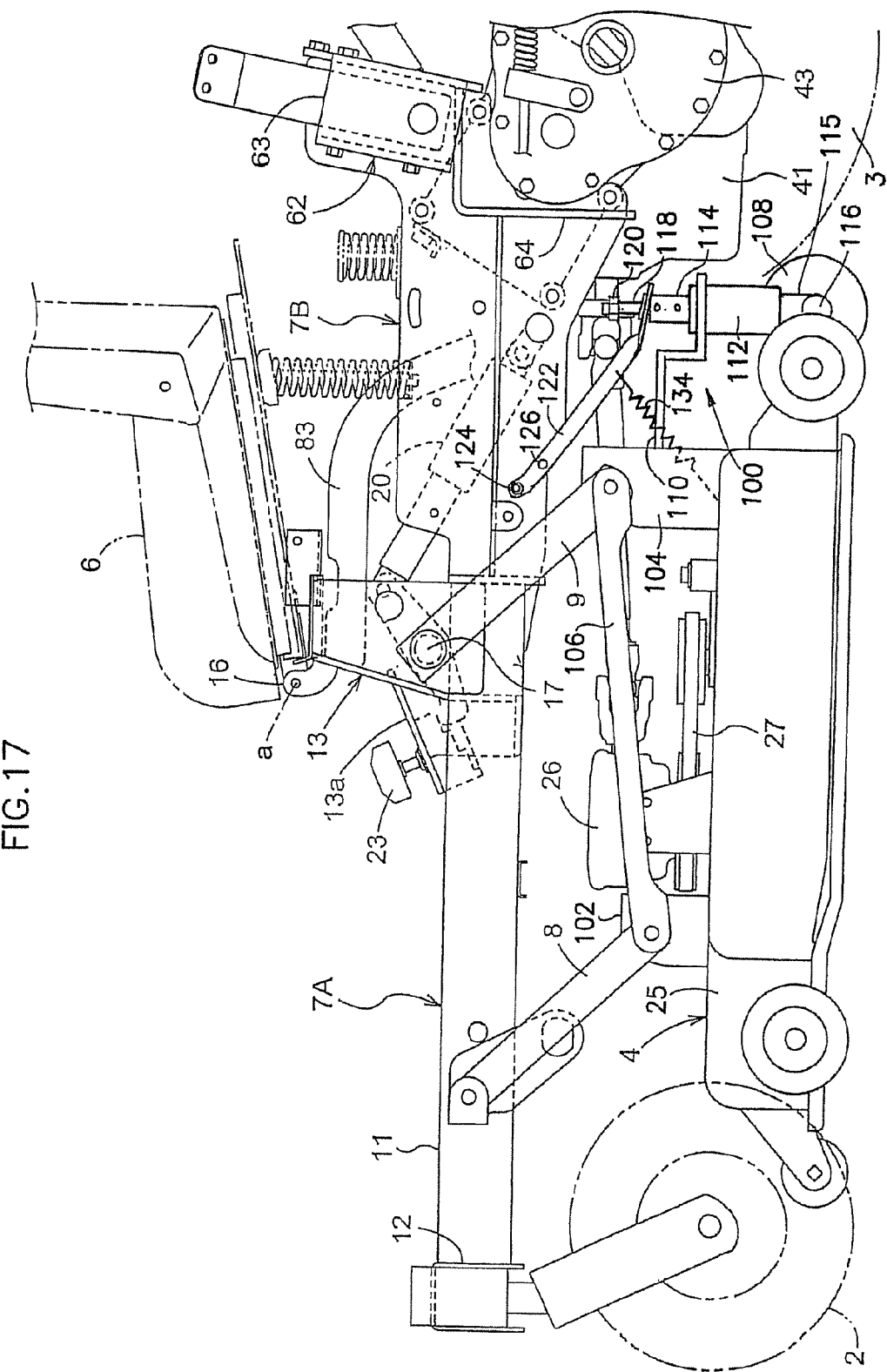
FIG. 17 is a left side view of an embodiment of the lawn mower with a grass striping mechanism and showing the mower-unit mounting section with the mower unit in a lowered position and the grass striping mechanism in a lowered operational position.
Figure 18:
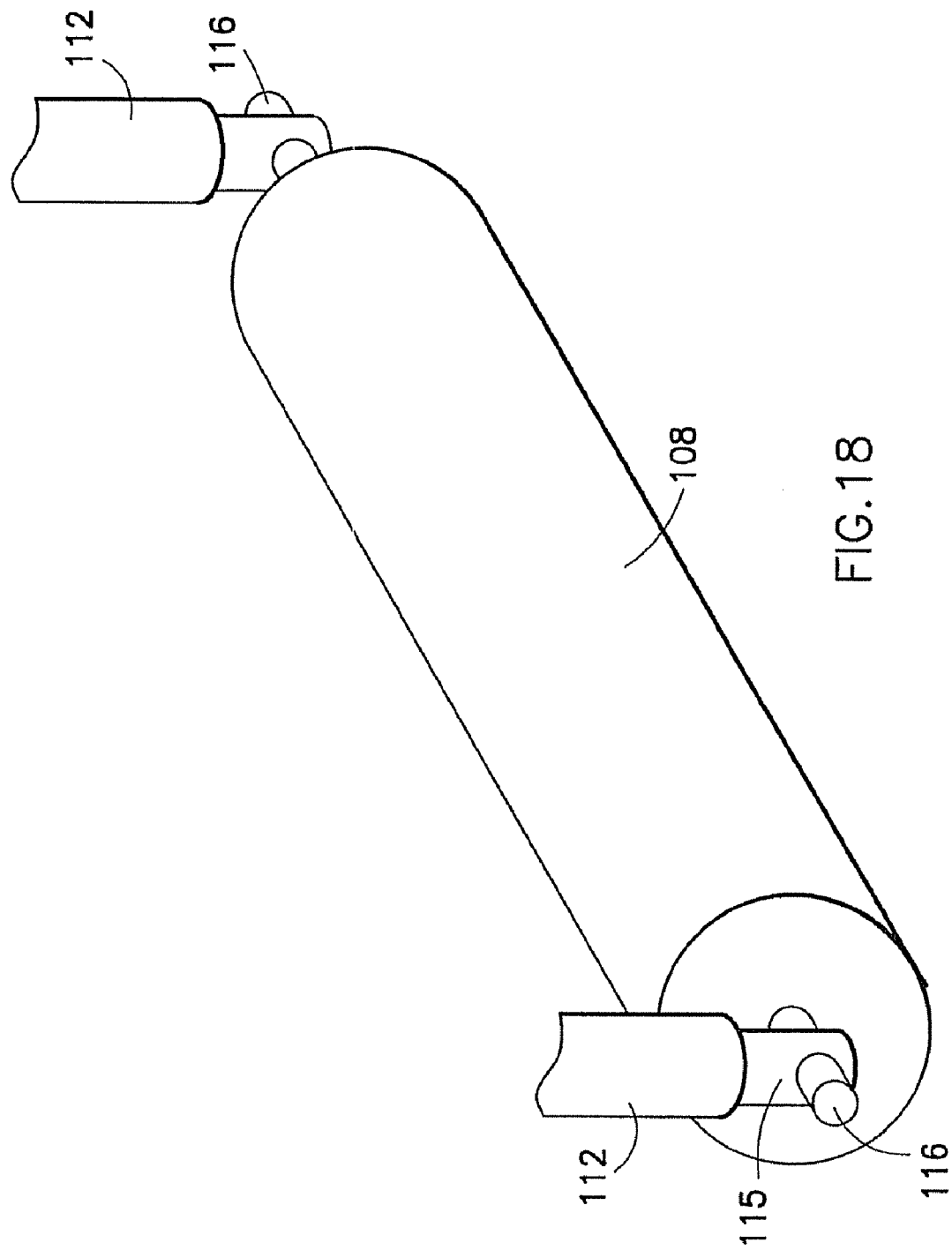
FIG. 18 is a perspective view of a portion of the grass striping mechanism showing a striping roller of the mechanism.
Figure 19:
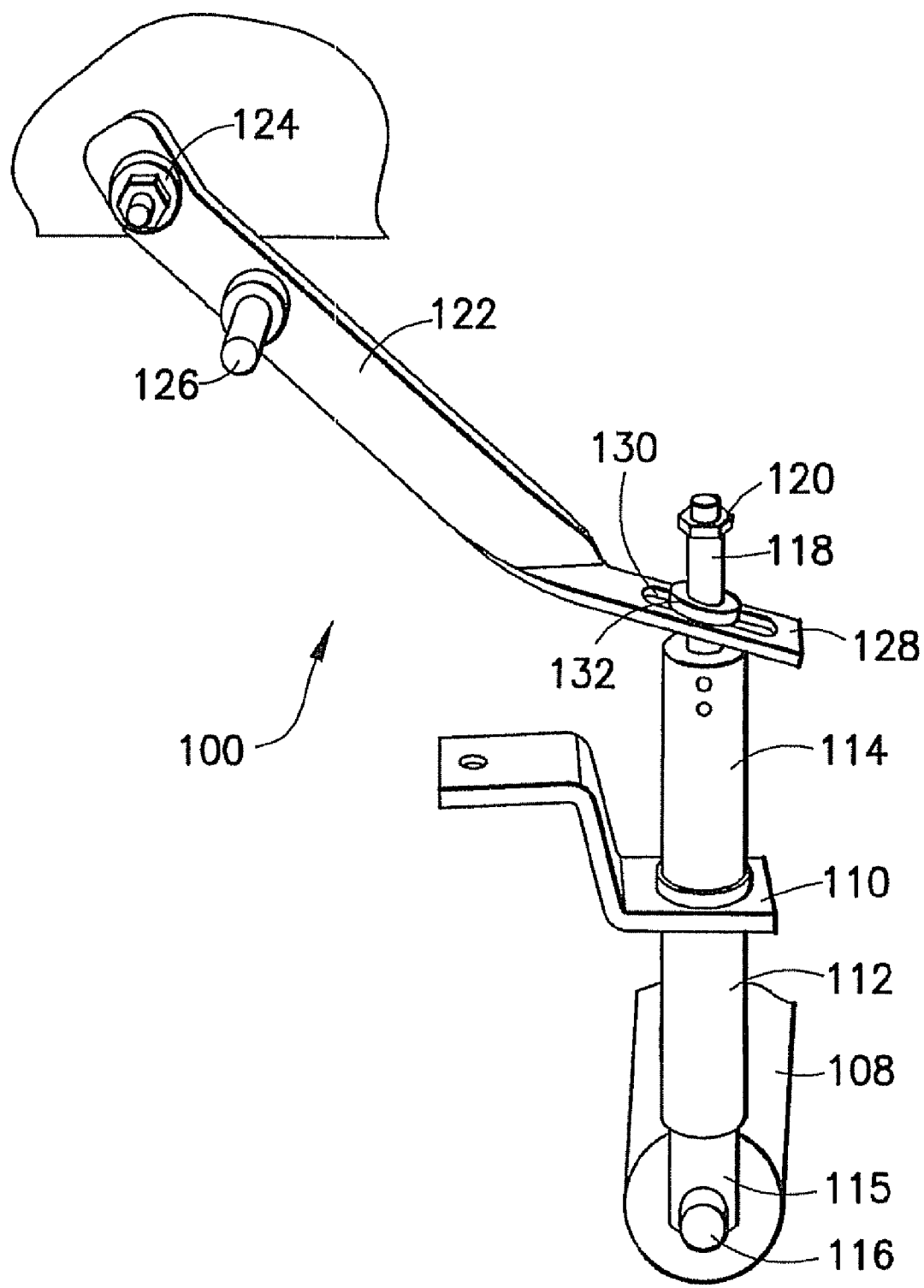
FIG. 19 is a perspective view showing the grass striping mechanism in isolation.
Figure 20:
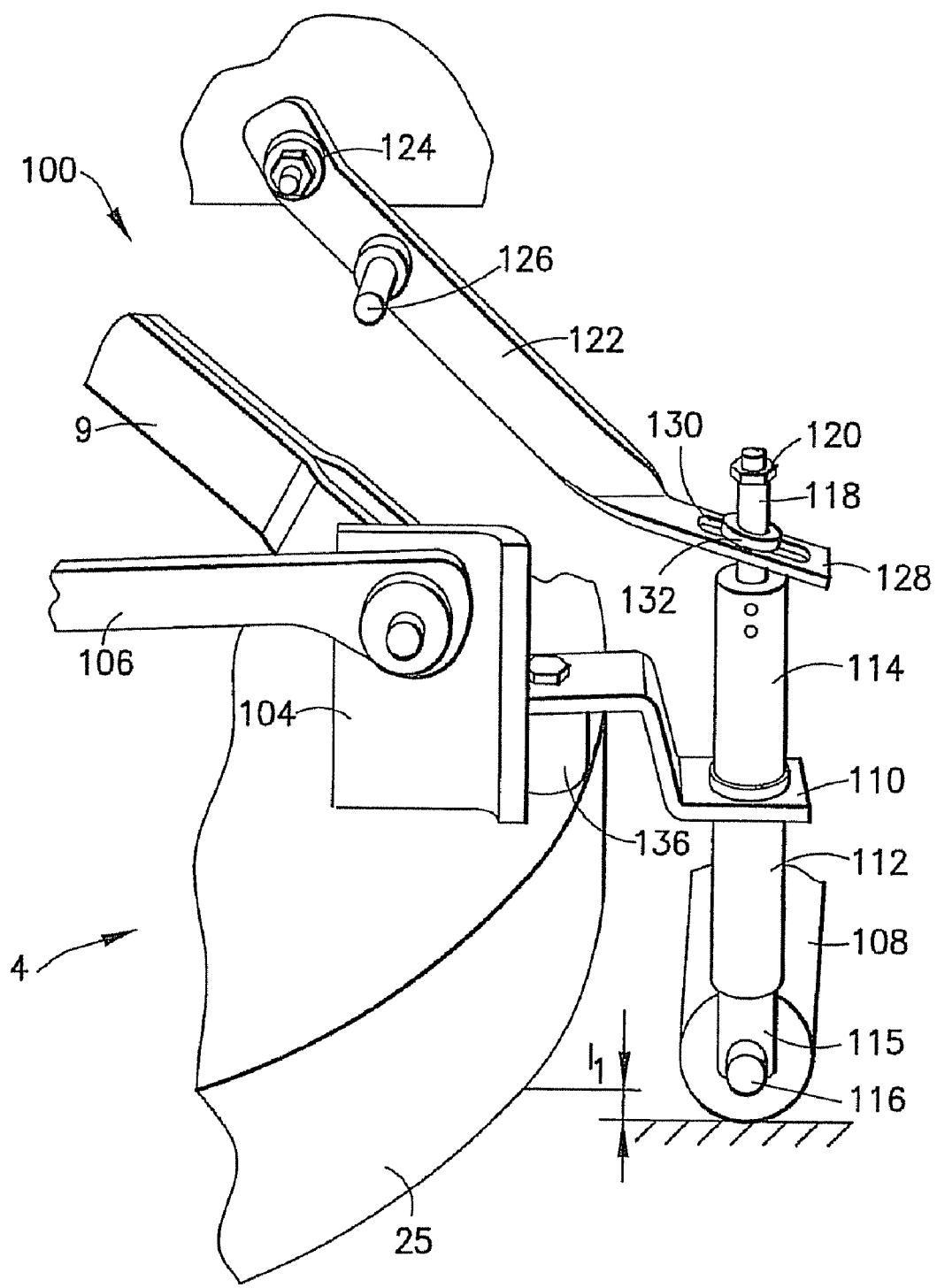
FIG. 20 is a perspective view showing the grass striping mechanism associated with the mower unit and in the lowered operational position.

The foregoing discussion relating to FIGS. 1-16 provides background disclosure relating to the lawn tractor and with reference now to FIGS. 17-23 another embodiment of the lawn tractor now further incorporating or comprising a grass striping mechanism 100 will be described. Grass striping mechanism 100 is associated with the body frame assembly 7 and interacts with mower unit 4 and, further, links 8, 9 associated with mower unit 4 which raise and lower the grass striping mechanism 100 between a lowered, operational state or position and a raised or transport state or position. As will be appreciated from the foregoing description of the lawn mower, duplicate sets of links 8, 9 are provided on each lateral side of vehicle body 1 and are used to raise and lower mower unit 4 as described previously. As depicted in FIG. 17, for example, links 8, 9 are associated with the body frame assembly 7, with right and left side links 8 pivotally associated with the right and left front longitudinal frames of front frame unit 7A and right and left side links 9 associated with second cross frame 13 via support shaft 17 of front frame unit 7A. "Front" links 8 are further pivotally connected, respectively, to front deck or post members 102 extending upward from mower deck 25 of mower unit 4. Similarly, "rear" links 9 are pivotally connected, respectively, to rear deck or post members 104 extending upward from mower deck 25 of mower unit 4. A connecting link 106 may be associated with each pair of links 8, 9 and extend between the ends of links 8, 9 that are pivotally connected to front and rear deck members 102, 104. As explained further herein, the upward and downward movement of links 9 during the raising and lowering of mower unit 4 is used to provide the motive force and movement necessary to move the grass striping mechanism 100 between a lowered, operational position and a raised, transport position. Thus, grass striping mechanism 100 is operated in conjunction with and by the operational movement of links 8, 9 used to raise and lower the mower unit 4. The operation of opposing links 9 by hydraulic cylinder 20 via drive arm 18, support shaft 17, and stay 19 was described previously.

It will be appreciated that grass striping mechanism 100 actually comprises two identical mechanisms disposed on lateral sides of the vehicle body 1 with each mechanism interfacing with the pair of links 8, 9 disposed on that lateral side. The mechanisms 100 are connected to and support a single grass striping roller 108. Striping roller 108 is desirably a unitary roller made of metal such as steel or stainless steel and extends the length or distance between opposing grass striping mechanisms 100. Striping roller 108 may be conventional in the art. As each laterally disposed grass striping mechanism 100 is identical and interfaces with the pair of links 8, 9 present on that lateral sides of vehicle body 1 in the same manner, the operation of only one such mechanism 100 as it interfaces with one pair of links 8, 9 is provided hereinafter. As an alternative, striping roller 108 may be segmented into individual rollers provided on a common shaft.

It will be further appreciated that the details of the lawn mower and, more particularly, vehicle body 1 discussed previously in connection with FIGS. 1-16 is provided as background information relating to a lawn mower vehicle body that is suitable for accepting the grass striping mechanism 100. The mower unit 4 described previously supported by links 8, 9 and the grass striping mechanism 100 that interfaces with these links 8, 9 may be provided on any riding-type lawn mower unit and is not limited to attachment to the specific vehicle body 1 detailed previously. Accordingly, the disclosure surrounding grass striping mechanism 100 is not intended to be limited to the specific lawn mower illustrated in FIGS. 1-16.

A generally horizontally-extending support or stay arm 110 is connected to the rear portion of mower deck 25 and, if desired, may be secured to and extend rearward from rear deck member 104. Shock absorbing members, such as rubber gaskets (not shown) may be associated with the fixed connection between stay arm 110 and mower deck 25 to isolate the mower deck 25 from vibration induced to the striping roller 108 during the operation of the grass striping mechanism 100 in a grass striping operation. A generally vertical guide tube or pipe 112 is associated with the rearward end of the stay arm 110. While stay arm 110 is shown in FIGS. 17-23 as having a generally stepped side profile this should not be considered as a limiting configuration of the stay arm 110 as the stay arm 110 may have any suitable profile which achieves the objective of providing clearance rearward from mower deck 25 where the generally vertical guide tube 112 may be situated. As will be appreciated from FIG. 17, as an example, stay arm 110 and guide tube 112 are disposed inward of rear wheel 3 and, accordingly, stay arm 110 is disposed on mower deck 25 to extend rearward therefrom to the open space inside of rear wheel 3. Accordingly, as discussed herein, striping roller 108 may have a length approximately equal to the distance between rear wheels 3.

A vertical roller support member 114 is inserted in and extends through guide tube 112. A lower end portion 115 of roller support member 114 supports a roller shaft 116 of the striping roller 108. Roller support member 114 is axially movable within guide tube 112. An upper end or portion 118 of roller support member 114 desirably has a smaller diameter or cross-sectional area which terminates in an interference structure 120, the purpose and use of which are discussed herein. In one non-limiting example, the roller support member 114 may be in the form of a hollow tube in much the same manner as guide tube 112 and the upper end or portion 118 of the roller support member 114 may be a solid rod-type structure with a threaded upper end 118 for accepting a nut that operates as the interference structure 120 as one example.

A lift link 122 is pivotally connected to rear frame unit 7B and, in particular, to rear longitudinal frame 14 of rear frame unit 7B. Lift link 122 pivots about pivot point or connection 124 with rear longitudinal frame 14 when actuated or engaged by rear link 9 during the raising and lower of mower unit 4 as described further herein. Lift link 122 and its pivot connection 124 are desirably located slightly to the rear of and on the inside of rear link 9 so that rear link 9 may move upward in a generally pivotal or arcuate manner in front of or on the outside of lift link 122. As rear longitudinal frame 14 is already located inward of front longitudinal frame 11 (as shown in FIG. 3), this orientation naturally follows by associating lift link 122 with rear longitudinal frame 14. Lift link 122 is provided with an abutment member 126 which extends outward from the lift link 122 and is intended to extend laterally outward with respect to the vehicle body 1 so that the abutment member 126 may be engaged by rear link 9 during raising and lowering of mower unit 4. Abutment member 126 may be simply in the form of a rod or shaft affixed to lift link 122 by mechanical connection or a more permanent connection in the form of welds. Abutment member 126 is provided in an intermediate region of lift link 122 such that direct physical engagement between the abutment member 126 and rear link 9 will allow the rear link 9 to lift (or lower) the lift link 122 in a generally pivotal or arcuate manner and thus cause the lifting and lowering of striping roller 108 as described herein in detail. The abutment member 126 transfers the motive forces applied to rear link 9 to lift link 122 which causes either the raising or lowering striping roller 108. The lift link 122 has a generally flattened end portion 128 that defines an elongated slot or aperture 130 through which the upper (rod-shaped) end portion 118 of roller support member 114 extends. Slot or aperture 130 may have a diameter approximately equal to that of the upper end portion 118 of roller support member 114, and, if desired, a washer or other annular structure 132 may be associated with the upper end portion 118. This annular structure 132 is intended to interface with interference structure 120 disposed at the end of upper end portion 118 during operation of mechanism 100 as described herein. The upper end portion 118 of roller support member 114 may freely move forward and backward in slot 130 as well as move upward and downward through slot 130. However, slot 130 is sized to prevent the main lower body of roller support member 114 from passing vertically through the slot 130.

Figure 21:
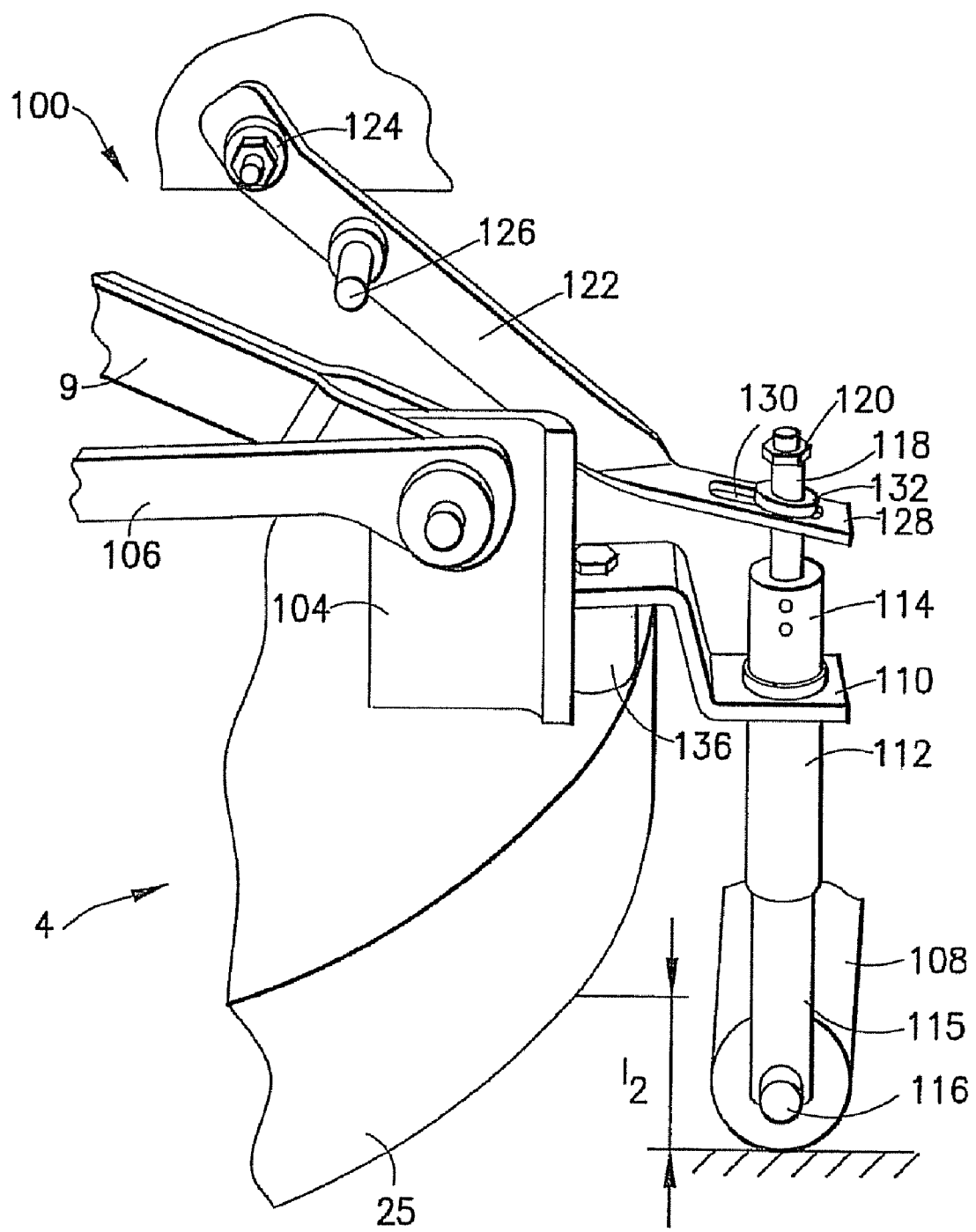
FIG. 21 is a perspective view showing the grass striping mechanism associated with the mower unit and in a first intermediate position during the raising of the mechanism to a raised, transport position.
Figure 22:
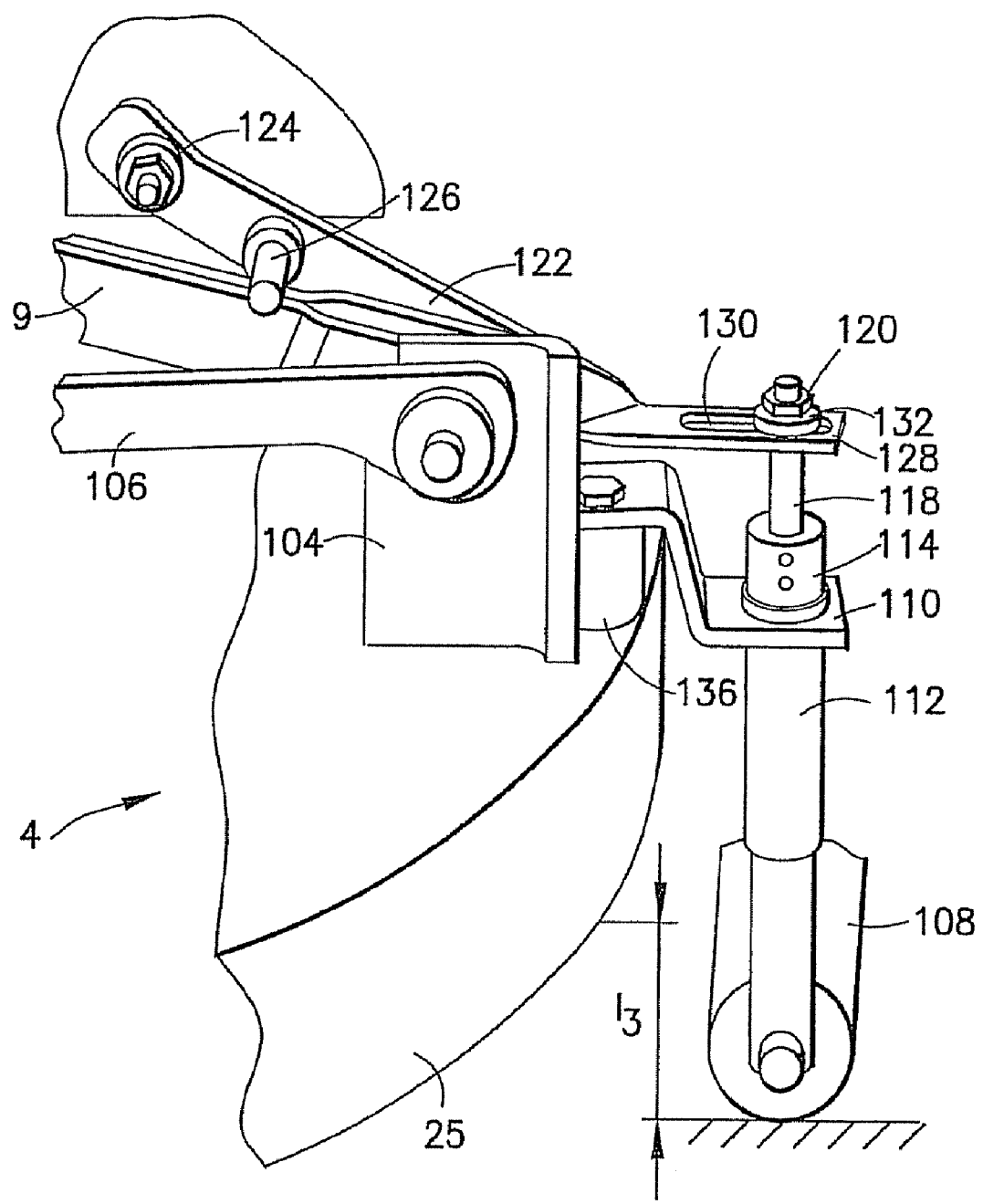
FIG. 22 is a perspective view showing the grass striping mechanism associated with the mower unit and in a second intermediate position during the raising of the mechanism to the raised, transport position.
Figure 23:
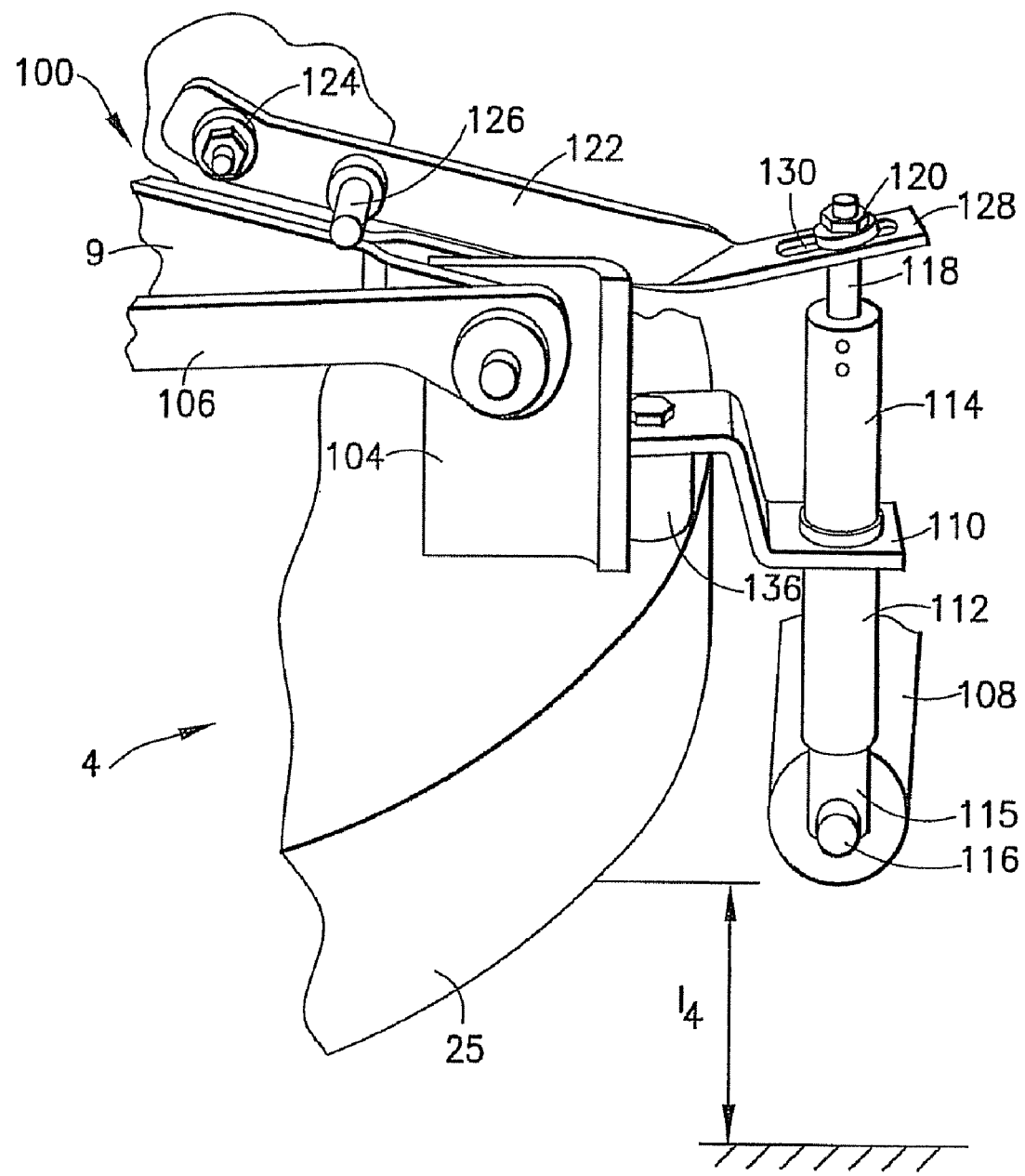
FIG. 23 is a perspective view showing the grass striping mechanism associated with the mower unit and in a fully raised, transport position.

If desired, an optional spring or other biasing structure 134 may be provided to extend between lift link 122 and mower deck 25 or between lift link 122 and rear deck member 104. This spring or biasing structure 134 can provide additional downward force on striping roller 108 when the grass striper mechanism 100 is in a lowered, operational position and the mower unit 4 is likewise in the lowered, mowing position. When the mower deck 25 of mower unit 4 is in the lowered position, spring 134 is in tension and pulls lift link 122 into contact with roller support member 114 and, specifically, the increased diameter lower end portion 115 of roller support member 114. Through the contact between roller support member 114 and lift link 122 urged by spring 134, additional downward force is applied to the ground via striping roller 108. When mower unit 4 is moved to its raised position, spring 134 is no longer in tension and rear link 9 abuts or engages abutment member 126 extending laterally from lift link 122 to maintain the grass striping mechanism 100 in a raised or transport position where striping roller 108 is lifted off the ground. As shown in FIGS. 21-23, a cylindrical support 136 may be used as a support and connecting structure for securing the stay arm 110 to mower deck 25. As indicated previously, vibration-dampening structures such as rubber gaskets may be associated with this structure and its connection to mower deck 25.

Operation of grass striping mechanism 100 in conjunction with mower unit 4 is discussed hereinafter with continuing reference to FIGS. 17-23. As shown in FIG. 17, with mower unit 4 in the lowered, mowing position, rear link 9 is not in engagement with abutment member 126 and striper roller 108 is in contact with the ground. Roller support member 114 extends through guide tube 112 and upper end portion 118 of the roller support member 114 extends through slot 130 in the end portion 128 of lift link 122. Interference structure 120 at the end of upper end portion 118 is disposed above the flattened end portion 128 of lift link 122. In this lowered, operational position of grass striping mechanism 100 which is illustrated generally in FIG. 20, striping roller 108 may freely move vertically during mowing operations by via the free axial movement of roller support member 114 in guide tube 112, with this movement only being interrupted in the vertical direction should the roller support member 114 extend downward sufficiently to the point where interference structure 120 engages the end portion 128 of lift link 122. Accordingly, the motion of roller support member 114 has at least a vertical component relative to ground level when the grass striping mechanism 100 is in the lowered or operational state which allows the striping roller 108 to move upward and downward to follow the contour of the ground during striping operations. The initial lowered operation position of grass striping mechanism 100 shown FIG. 20 locates the striping roller 108 in contact with the ground and the bottom of mower deck 25 is located a distance $l_1$ above the ground in the mowing position of mower unit 4.

When mowing operations are complete and it is desired to lift the mower unit 4 to a transport position, the operational movement of mower unit 4 to its raised or transport position is used to place the grass striping mechanism 100 into its raised or transport position or configuration. Mower unit 4 is moved to its raised or transport state in the manner described previously. During the upward and rearward and generally pivotal movement of mower unit 4, rear link 9 pivots about its pivotal connection with front frame unit 7A via support shaft 17 and second cross frame 13, and rotates upwards and rearward toward lift link 122, as shown in FIG. 21. During this initial upward and rearward movement of mower unit 4, striping roller 108 initially also moves rearward due to the fixed connection between mower deck 25 and guide tube 112 provided by horizontal stay arm 110. This generally horizontal rearward movement causes upper end portion 118 to simultaneously move rearward in slot 130 in the end portion 128 of lift link 122, as generally shown in FIG. 21. Thus, the movement of striping roller 108 and roller support member 114 may have a generally horizontal component during the raising and lowering motion of grass striping mechanism 100. Moreover, as roller support member 114 is free to move axially within guide tube 112, as guide tube 112 is lifted upward due to its fixed connection via stay arm 110 to mower deck 25, roller support member 114 moves downward a short distance in guide tube 112 under the force of gravity applied to striping roller 108, thereby maintaining the striping roller 108 in contact with the ground. The distance $l_1$ between the bottom of mower deck 25 and the ground and, hence, between the bottom of the mower deck 25 and the bottom of the striping roller 108 in contact with the ground increases to distance $l_2$. As roller support member 114 moves downward in guide tube 112, interference structure 120 make contact with annular member 132, if present, at the upper surface or side of the end portion 128 of lift link 122. Any upward movement of lift link 122 will now also lift roller support member 114 and, thus, striping roller 108. This situation is shown in FIG. 22, with striping roller 108 just remaining in contact with the ground and mower deck 25 still moving upward away from the ground. At this point a maximum distance $l_3$ is present between the bottom of mower deck 25 and the ground.

At some point in the upward pivotal movement of rear link 9, rear link 9 abuts and engages abutment member 126, as shown generally in FIG. 23. In so doing, the upward pivotal movement of rear link 9 is transferred to lift link 122 via abutment member 126. This engagement causes lift link 122 to pivot about its pivot connection 124 with rear frame unit 7B and lift link 122 pivots upward along with rear link 9. The abutment of interference structure 120 with the end portion 128 of lift link 122 ensures that roller support member 114 and striping roller 108 are lifted upward toward a raised or transport position. When the mower unit 4 is raised to its raised or transport position by links 8, 9, roller support member 114 and striping roller 108 are also placed in a transport state wherein the striping roller 108 is held in a position above ground level (represented by distance $l_4$) and to the rear of mower deck 25. The foregoing process is generally followed in reverse to return the mower unit 4 and grass striping mechanism 100 and, hence, striping roller 108 to the mowing and grass striping positions, respectively.

If optional spring 134 is associated with grass striping mechanism 100, additional downward pressure is applied to striping roller 108. Spring 134 provides additional downward pressure without the need for increasing the weight of striping roller 108. When the mower deck 25 of mower unit 4 is in the lowered, mowing position, spring 134 is in tension and pulls lift link 122 into contact with roller support member 114 and, specifically, the increased diameter lower end portion 115 of roller support member 114. Through the contact between roller support member 114 and lift link 122 urged by spring 134, increased downward force is applied to the ground via striping roller 108. When mower unit 4 is moved to its raised position, spring 134 is no longer in tension and, therefore, applies no additional pressure or force to interference structure 120, abutment member 126 extending laterally outward from lift link 122, or rear link 9.

While several embodiments of a lawn mower and a lawn mower with a grass striping mechanism were described hereinabove, those skilled in the art may make modifications and alterations to these embodiments without departing from the scope and spirit of the invention. Accordingly, the foregoing description is intended to be illustrative rather than restrictive. The invention described hereinabove is defined by the appended claims and all changes to the invention that fall within the meaning and the range of equivalency of the claims are embraced within their scope.

The invention claimed is:

1. A lawn mower, comprising:
a vehicle body comprising a pair of front wheels and a pair of rear wheels;
a mower unit mounted to the vehicle body between the front wheels and rear wheels, the mower unit suspended from the vehicle body by links, the links movable to raise and lower the mower unit relative to ground level; and
a grass striping mechanism connected with the vehicle body and mower unit, comprising:
a stay arm connected to the mower unit;
a roller support member movably connected to the stay arm such that the roller support member is capable of movement having at least a generally vertical component relative to ground level;
a grass striping roller rotationally supported by the roller support member; and
a lift link connected to the vehicle body and connected with the roller support member, the lift link comprising an abutment member to engage with at least one of the links such that upward movement of the at least one link imparts movement to the lift link and the roller support member to lift the grass striping roller from contact with the ground to a raised transport position.

2. A lawn mower as claimed in claim 1 wherein the stay arm comprises a guide tube and the roller support member is axially received in the guide tube.

3. A lawn mower as claimed in claim 1 wherein the lift link comprises a portion defining an aperture through which an upper end portion of the roller support member extends.

4. A lawn mower as claimed in claim 3 wherein the aperture is in the form of an elongated slot such that the roller support member is capable of movement having a generally horizontal component relative to ground level.

5. A lawn mower as claimed in claim 1 wherein the lift link is pivotally connected to the vehicle body.

6. A lawn mower as claimed in claim 1 wherein an upper end portion of the roller support member comprises an interference structure adapted to be engaged by the lift link to effect lifting of the roller support member in a generally vertical direction.

7. A lawn mower as claimed in claim 1, comprising a spring extending between the mower unit and lift link and providing a biasing force applying downward pressure on the grass striping roller.

8. A lawn mower as claimed in claim 1, the abutment member extending from the lift link and positioned for interference engagement with one of the links, the interference engagement imparting movement to the lift link and the roller support member to lift the grass striping roller from contact with the ground.

9. A lawn mower as claimed in claim 1 wherein the grass striping roller has a length approximately equal to the distance between the rear wheels.

10. A lawn mower, comprising:

a front frame unit supporting a pair of front wheels;

a rear frame unit connected to the front frame unit and supporting a pair of rear wheels;

a mower unit suspended from the front frame unit by front and rear links, the front and rear links movable to raise and lower the mower unit relative to ground level; and a grass striping mechanism connected with the rear frame unit and mower unit, comprising:

a stay arm connected to the mower unit;

a roller support member movably connected to the stay arm such that the roller support member is capable of movement having at least a generally vertical component relative to ground level;

a grass striping roller rotationally supported by the roller support member; and a lift link connected to the rear frame unit and connected with the roller support member, the lift link comprising an abutment member to engage with the rear link such that upward movement of the rear link imparts movement to the lift link and the roller support member to lift the grass striping roller from contact with the ground to a raised transport position.

11. A lawn mower as claimed in claim 10 wherein the stay arm comprises a guide tube and the roller support member is axially received in the guide tube.

12. A lawn mower as claimed in claim 10 wherein the lift link comprises a portion defining an aperture through which an upper end portion of the roller support member extends.

13. A lawn mower as claimed in claim 12 wherein the aperture is in the form of an elongated slot such that the roller support member is capable of movement having a generally horizontal component relative to ground level.

14. A grass striping mechanism as claimed in claim 10 wherein the lift link is pivotally connected to the rear frame unit.

15. A grass striping mechanism as claimed in claim 10 wherein an upper end portion of the roller support member comprises an interference structure adapted to be engaged by the lift link to effect lifting of the roller support member in a generally vertical direction.

16. A lawn mower as claimed in claim 10, comprising a spring extending between the mower unit and lift link and providing a biasing force applying downward pressure on the grass striping roller.

17. A lawn mower as claimed in claim 10, the abutment member extending from the lift link and positioned for interference engagement with the rear link, the interference engagement imparting movement to the lift link and the roller support member to lift the grass striping roller from contact with the ground.

18. A lawn mower as claimed in claim 10, comprising a hydraulic cylinder coupled to the rear link and adapted to cause upward movement of the rear link to raise and lower the mower unit.

19. A lawn mower as claimed in claim 18 wherein the rear link is coupled to the hydraulic cylinder by a drive arm such that extension of the hydraulic cylinder induces upward pivotal movement of the rear link via the drive arm.

* * * * *